United States Patent
Xia et al.

(10) Patent No.: US 11,896,144 B1
(45) Date of Patent: Feb. 13, 2024

(54) DETERMINING INVENTORY LEVELS USING ROTATABLE COUNTING DEVICES AND VISUAL IMAGERY

(71) Applicant: Amazon Technologies, Inc., Seattle, WA (US)

(72) Inventors: Ziwei Xia, Seattle, WA (US); Jean Laurent Guigues, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 680 days.

(21) Appl. No.: 17/110,887

(22) Filed: Dec. 3, 2020

(51) Int. Cl.
| | | |
|---|---|---|
| *G06K 9/00* | (2022.01) | |
| *A47F 1/12* | (2006.01) | |
| *G07F 9/02* | (2006.01) | |
| *G06K 19/06* | (2006.01) | |
| *G06Q 10/087* | (2023.01) | |
| *G06V 20/52* | (2022.01) | |

(52) U.S. Cl.
CPC .............. *A47F 1/126* (2013.01); *G06K 19/06* (2013.01); *G06Q 10/087* (2013.01); *G06V 20/52* (2022.01); *G07F 9/02* (2013.01); *G06K 2019/06253* (2013.01)

(58) Field of Classification Search
CPC .... A47F 1/126; A47F 1/00; A47F 1/04; A47F 1/125; G06K 19/06; G06K 2019/06253; G06K 19/06028; G06Q 10/087; G06Q 10/08; G06Q 30/0201; G06Q 10/0631; G06V 20/52; G06V 10/225; G06V 10/245; G07F 9/00
See application file for complete search history.

(56) References Cited

U.S. PATENT DOCUMENTS

| | | |
|---|---|---|
| 7,201,281 B1 * | 4/2007 | Welker .................... A47F 1/126 211/59.3 |
| 7,225,980 B2 | 6/2007 | Ku et al. |
| 7,949,568 B2 | 5/2011 | Fano et al. |
| 8,009,864 B2 | 8/2011 | Linaker et al. |
| 8,175,925 B1 | 5/2012 | Rouaix |
| 8,189,855 B2 | 5/2012 | Opalach et al. |

(Continued)

OTHER PUBLICATIONS

Abhaya Asthana et al., "An Indoor Wireless System for Personalized Shopping Assistance", Proceedings of IEEE Workshop on Mobile Computing Systems and Applications, 1994, pp. 69-74, Publisher: IEEE Computer Society Press.

(Continued)

*Primary Examiner* — Duy M Dang
(74) *Attorney, Agent, or Firm* — Athorus, PLLC

(57) ABSTRACT

A counting device bears a visually distinct pattern or marking, and is coupled to a pusher or other movable system of a shelf in a manner that causes the counting device to rotate in response to changes in position of the pusher. When items are placed on a shelf, or removed from the shelf, causing the pusher to move, the pattern on the counting device rotates at an angle defined by an extent of the movement of the pusher. Images captured of the counting device at various times may be processed to determine orientations of the pattern at such times. Where a change in an orientation of a pattern is detected, a number of items added to or removed from a shelf may be calculated based on the change in orientation and an event involving the number of items may be determined to have occurred.

20 Claims, 24 Drawing Sheets

(56) References Cited

U.S. PATENT DOCUMENTS

| | | | |
|---|---|---|---|
| 8,423,431 | B1 | 4/2013 | Rouaix et al. |
| 8,630,924 | B2 | 1/2014 | Groenevelt et al. |
| 8,688,598 | B1 | 4/2014 | Shakes et al. |
| 9,473,747 | B2 | 10/2016 | Kobres et al. |
| 10,206,519 | B1 * | 2/2019 | Gyori .................... H01F 27/402 |
| 2003/0002712 | A1 | 1/2003 | Steenburgh et al. |
| 2004/0181467 | A1 | 9/2004 | Raiyani et al. |
| 2008/0055087 | A1 | 3/2008 | Horii et al. |
| 2008/0077511 | A1 | 3/2008 | Zimmerman |
| 2008/0109114 | A1 | 5/2008 | Orita et al. |
| 2009/0121017 | A1 | 5/2009 | Cato et al. |
| 2009/0245573 | A1 | 10/2009 | Saptharishi et al. |
| 2011/0011936 | A1 | 1/2011 | Morandi et al. |
| 2011/0284488 | A1 * | 11/2011 | Hardy .................... A47F 1/125 |
| | | | 211/59.3 |
| 2012/0284132 | A1 | 11/2012 | Kim et al. |
| 2013/0076898 | A1 | 3/2013 | Philippe et al. |
| 2013/0253700 | A1 | 9/2013 | Carson et al. |
| 2014/0279294 | A1 | 9/2014 | Field-Darragh et al. |
| 2014/0362223 | A1 | 12/2014 | LaCroix et al. |
| 2015/0019391 | A1 | 1/2015 | Kumar et al. |
| 2015/0073907 | A1 | 3/2015 | Purves et al. |
| 2019/0050792 | A1 * | 2/2019 | Kobayashi ......... G06Q 30/0201 |

OTHER PUBLICATIONS

Cristian Pop, "Introduction to the BodyCom Technology", Microchip AN1391, May 2, 2011, pp. 1-24, vol. AN1391, No. DS01391A, Publisher: 2011 Microchip Technology Inc.

\* cited by examiner

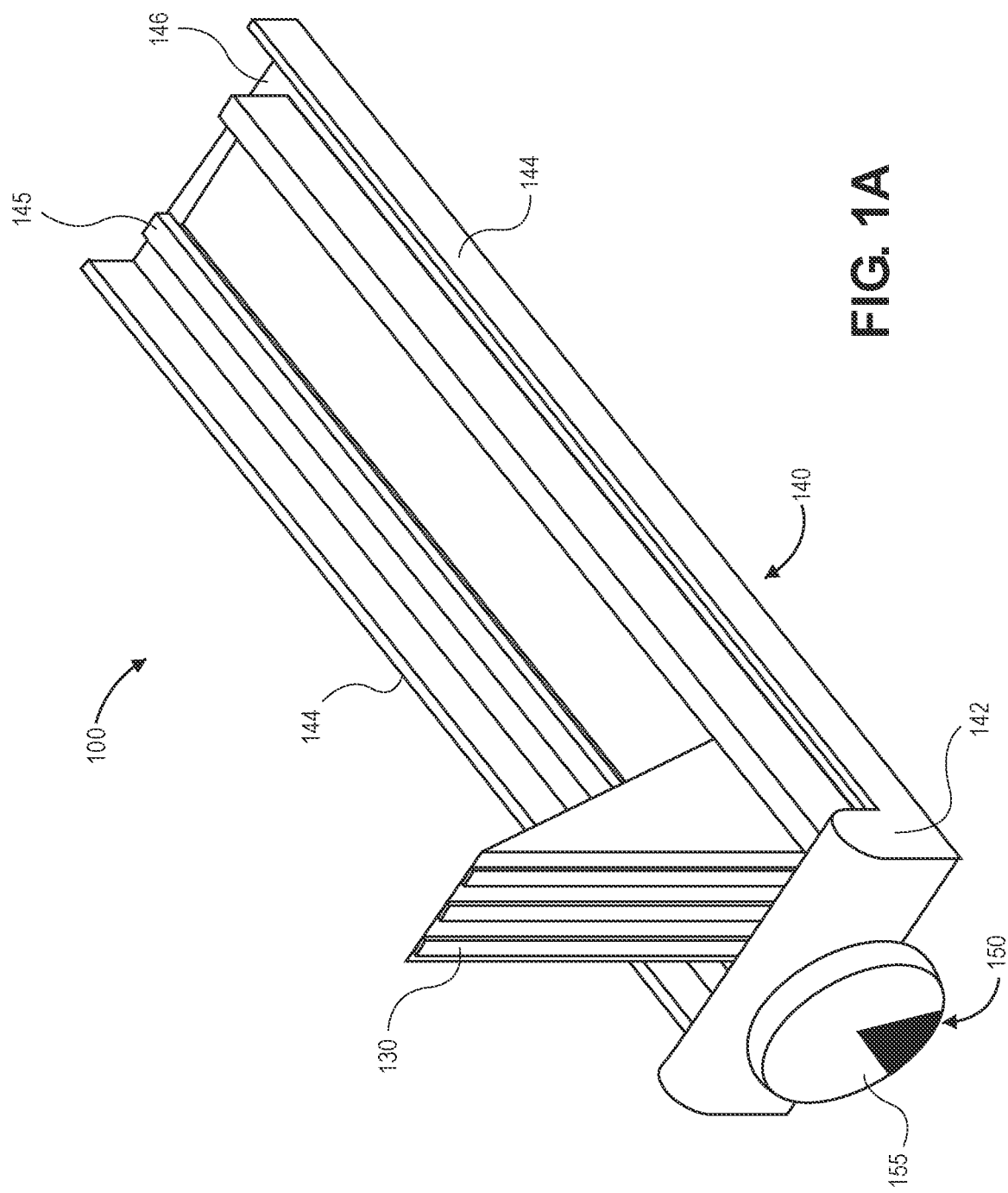

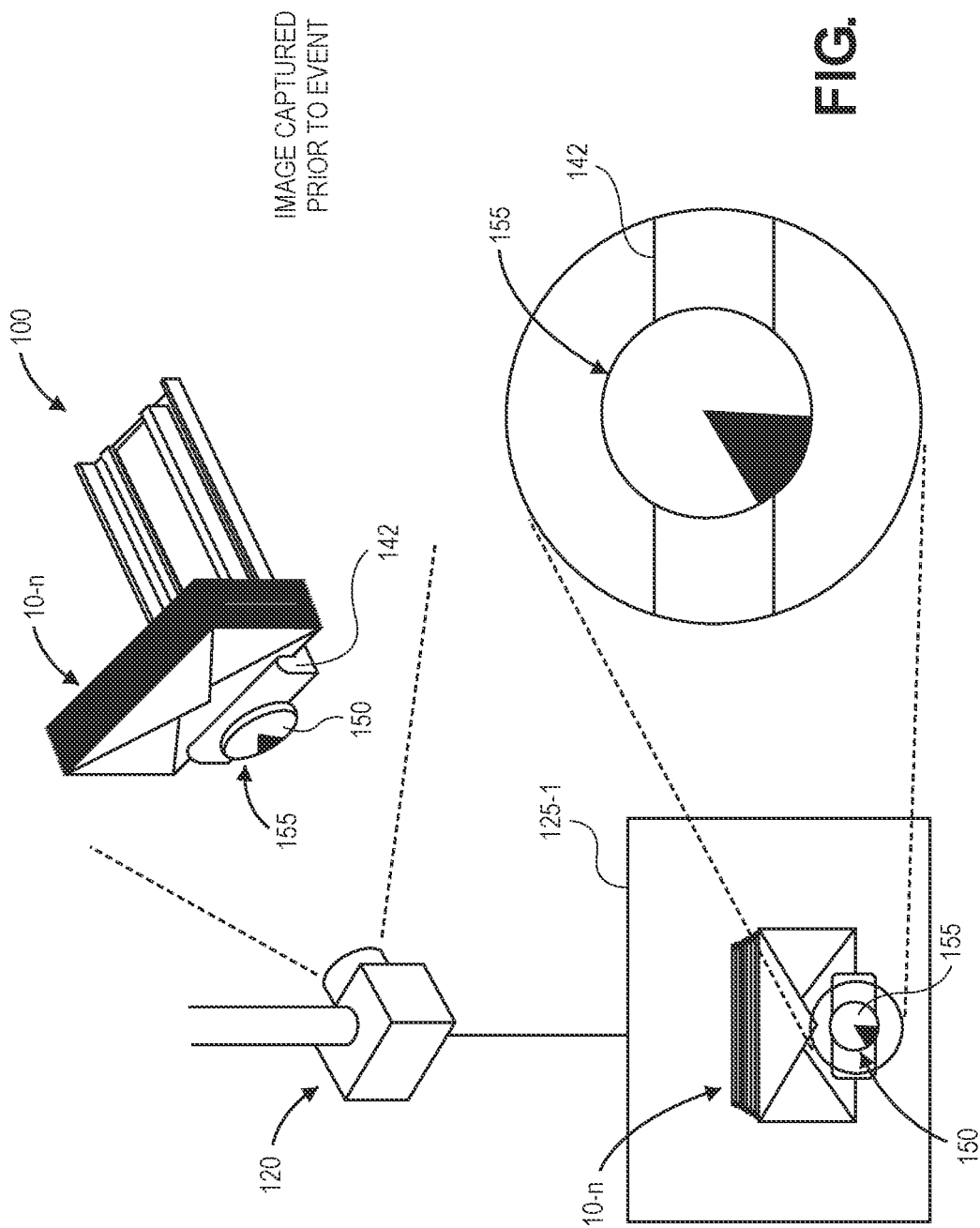

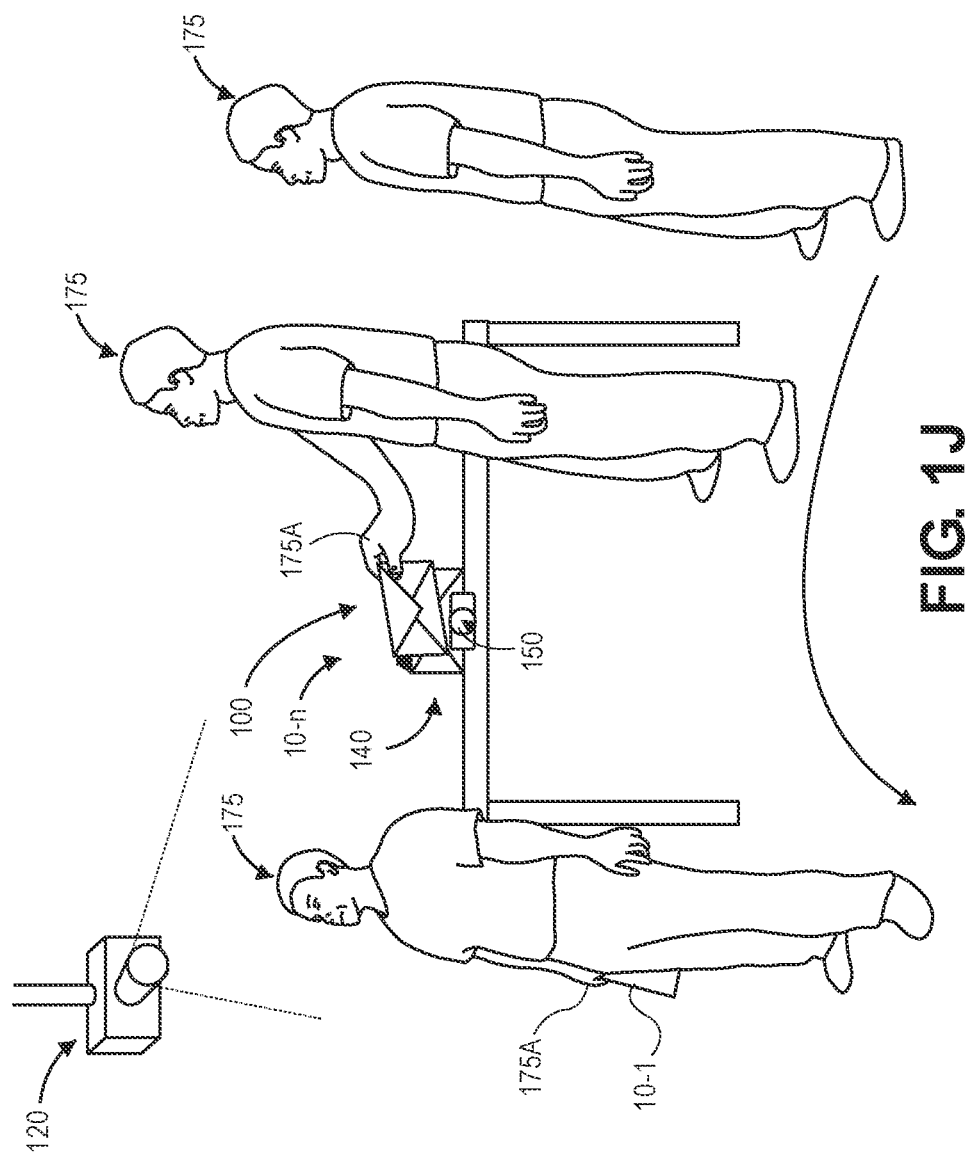

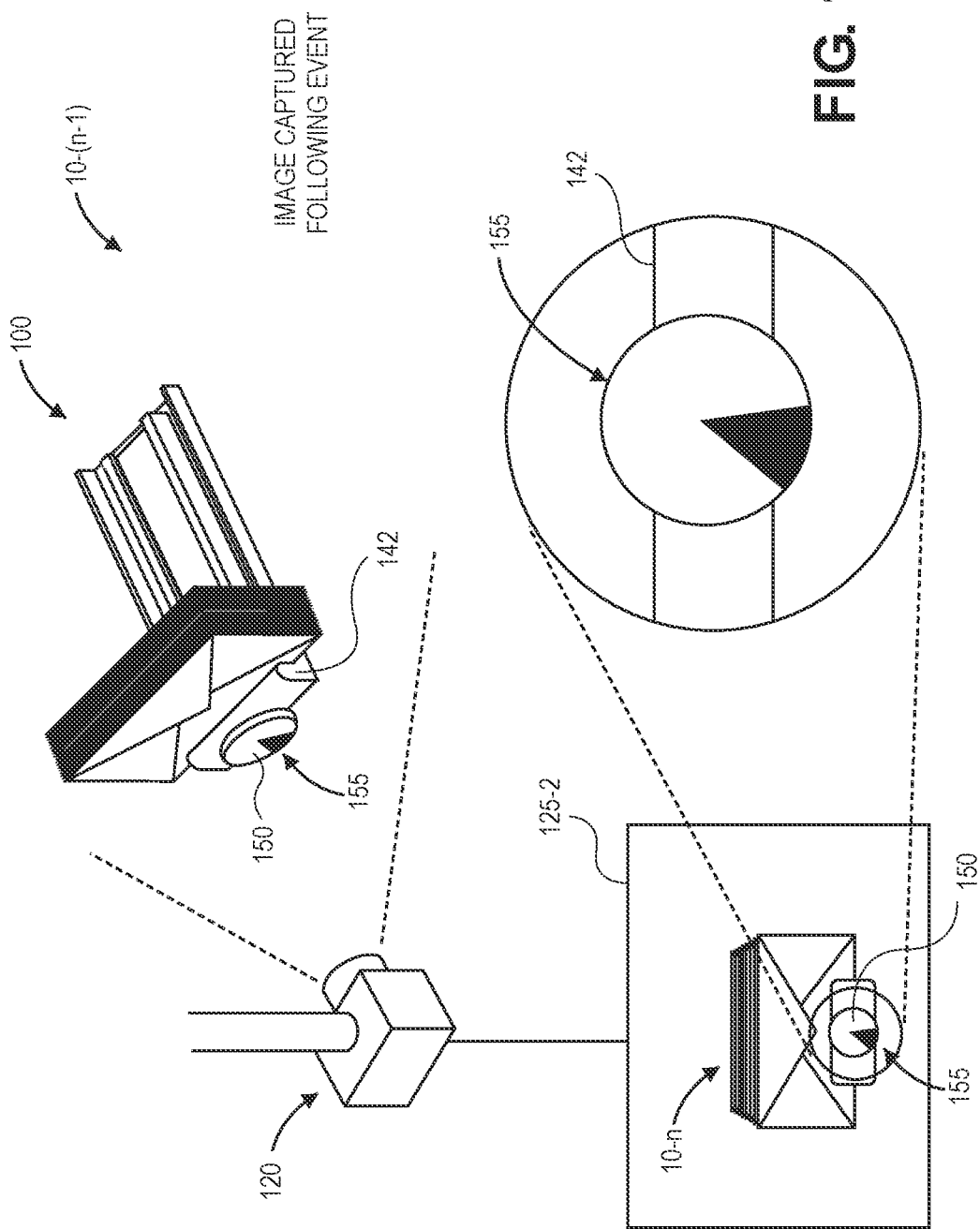

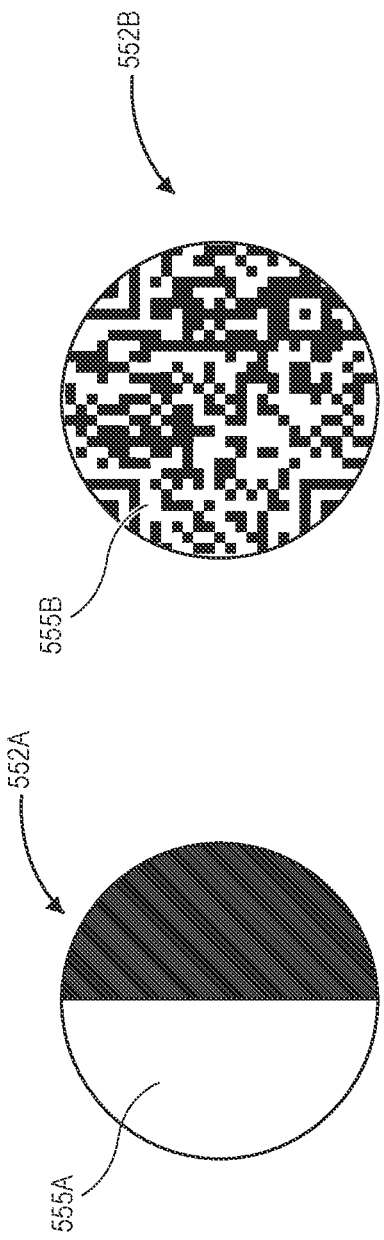
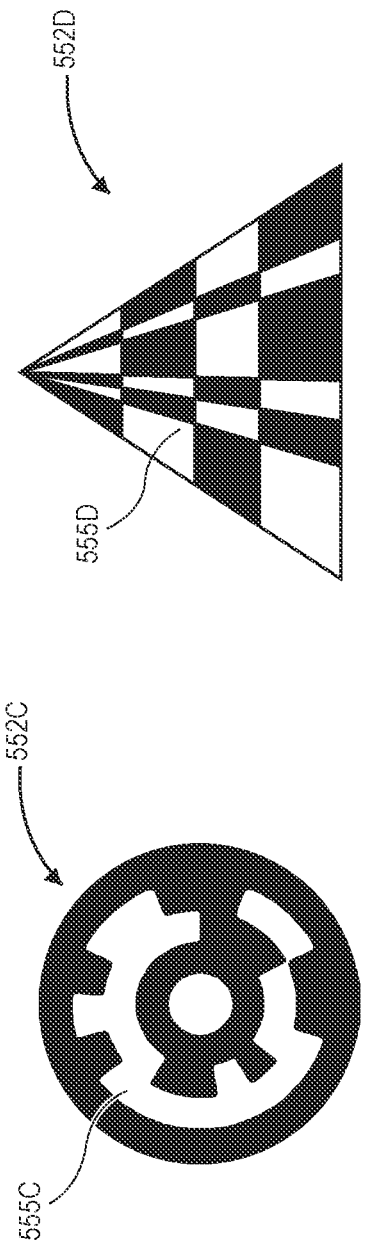
FIG. 5A  FIG. 5B  FIG. 5C  FIG. 5D

DETERMINING INVENTORY LEVELS USING ROTATABLE COUNTING DEVICES AND VISUAL IMAGERY

BACKGROUND

Today, high-technology systems are being incorporated into traditional bricks-and-mortar commercial settings. For example, in a materials handling facility, such as a retail store or establishment, a camera or another imaging device may be provided in one or more locations and configured to include portions of the materials handling facility within its field of view. Images captured by the camera may be processed to identify one or more customers or other personnel within the materials handling facility, to detect movements of such customers or personnel, or to identify items that are removed from storage units by such customers or personnel, or placed on such storage units by such customers or personnel. Additionally, one or more load sensors may be provided in association with one or more storage units within a materials handling facility, e.g., beneath shelves or other surfaces of the materials handling facility.

Many items that are available at a materials handling facility are substantially large or have sizes, shapes or textures that are visually distinct. Interactions with such items may be readily detected by cameras, load sensors, or other components. Some items have slight masses or volumes, however, or have sizes or shapes that are sufficiently small. In many instances, the use of cameras, load sensors or other components to detect or track interactions involving items having the slight masses or volumes, or the small sizes or shapes, may be ineffective.

BRIEF DESCRIPTION OF THE DRAWINGS

FIGS. 1A through 1M are views of aspects of one system for determining inventory levels in accordance with implementations of the present disclosure.

FIGS. 5A through 5D are views of aspects of systems for determining inventory levels in accordance with implementations of the present disclosure.

DETAILED DESCRIPTION

Figure 1B:
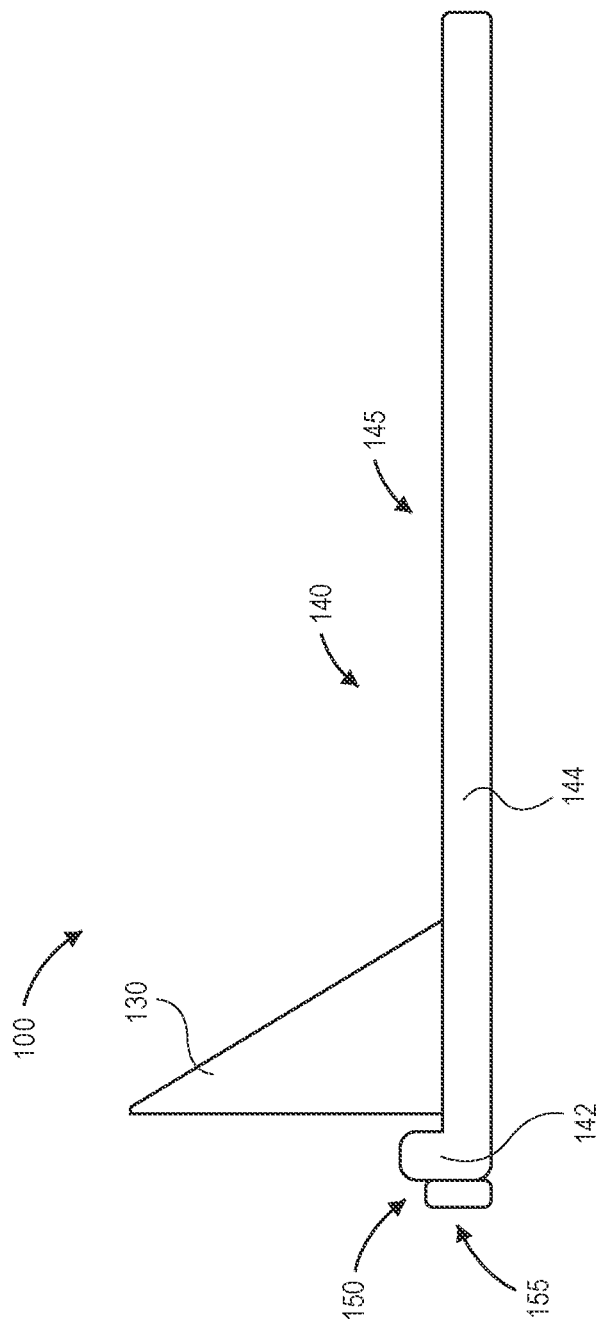

As is set forth in greater detail below, the present disclosure is directed to systems and methods for determining inventory levels using rotatable counting devices and visual imagery. More specifically, one or more implementations of the present disclosure are directed to counting devices having one or more rotatable components with visually distinct patterns or other markings on one or more surfaces. The patterns or markings may include any number of lines, shapes, colors, textures, alphanumeric characters, symbols or the like, defining arrangements from which unique orientations of the patterns or markings may be unambiguously determined by a human or a computer device or system. The counting devices may be mounted to or otherwise disposed in association with linear inventory systems, e.g., at front edges of such systems. The counting devices may be coupled to pushers or other movable systems that move or travel in tracks or on other components of shelves, e.g., by tension members or other systems. Changes in a linear position of a pusher result in changes in angular orientation of a visually distinct surface of a counting device that are proportional to the changes in the linear position of the pusher. Any number of items may be accommodated between a pusher and a fixed end of a linear inventory system.

One or more cameras or other imaging devices having the linear inventory systems within their respective fields of view may be aligned to capture images of the linear inventory systems at regular intervals. The images may be processed to detect features of a visually distinct surface of a counting device, and to determine whether an orientation of the visually distinct surface of a counting device has changed based on such features. Where a change in an orientation of the visually distinct surface about an axis is detected between two images, the change in the orientation may be translated to a change in a linear position of the pusher between times at which the images were captured. The change in the linear position of the pusher may be further translated to a number of items that were placed within a space between the pusher and the end of the linear inventory system, or removed from the space between the pusher and the end of the linear inventory system, between such times. The cameras may be aligned at distances from a counting device, and in an orientation with respect to the counting device, that ensures that the counting device and a visually distinct surface thereon may be readily detected within images captured by the cameras. In some implementations, the distances and the orientations of the counting device may be selected based on one or more attributes of the cameras, including levels of resolution of the cameras. Moreover, the cameras may be calibrated to detect the visually distinct surface within images captured thereby, such as by programming the cameras with locations of the visually distinct surface within the field of view of the camera, or by configuring the cameras to detect the visually distinct surface within images captured thereby.

Accordingly, records of inventory levels on a shelf or other surface associated with a pusher and a counting device may be updated accordingly where changes in a linear position of the pusher, represented as changes in orientation of the visually distinct surface of the counting device about an axis, are detected within imaging data.

Referring to FIGS. 1A through 1M, views of one implementation of a linear inventory system 100 for determining inventory levels in accordance with the present disclosure are shown. As is shown in FIGS. 1A and 1B, the linear inventory system 100 includes a pusher 130, an inventory shelf 140 and a counting device 150. In some implementations, the shelf 140 may be specifically designated to receive one or more homogeneous items of the same kind or type, e.g., items having a substantially constant or reliable thickness. Alternatively, in some implementations, the shelf 140 may be configured to receive one or more items of any kind or type, and need not be restricted to homogeneous items, or items having constant or reliable thicknesses. Moreover, the shelf 140 may be provided in association with any number of other inventory shelves 140, e.g., and such other shelves may but need not be outfitted with pushers 130 and counting devices 150.

The pusher 130 is movably (e.g., slidably) mounted within a track 145 that extends away from a front wall 142 of the shelf 140, between a pair of side walls 144 of the shelf 140, and is provided on a bottom surface 146 of the shelf 140. For example, in some implementations, one or more aspects of the pusher 130 may be slidably accommodated within channels aligned laterally on either or both sides of the track 145. Such channels or extensions may enable the pusher 130 to be guided within the track 145, e.g., as the pusher 130 slides or otherwise linearly translates along the track 145, and may maintain the pusher 130 within the track 145. Alternatively, the pusher 130 may be caused to remain within the track 145 in any other manner.

As is also shown in FIGS. 1A and 1B, the counting device 150 is rotatably mounted to the front wall 142 of the shelf 140. The counting device 150 includes a pattern 155 on a front surface that is a visible, distinct marking (viz., a substantially dark wedge provided on a substantially light background). The pattern 155 is defined by an arcuate portion of a perimeter of the front surface and a pair of radii extending from ends of the arcuate position to a center of the front surface. In some implementations, aspects of the pattern 155 (e.g., sizes or shapes of substantially dark or substantially light portions of the front surface) may be of any color, size or thickness, and may be selected to create a visual contrast with one another, such as combinations of white and dark colors, or primary and secondary colors, or the like. Alternatively, in some implementations, the pattern 155 may include any other type or form of markings thereon, including one or more other lines, shapes, colors, textures, alphanumeric characters, symbols or any other markings, including one or more of such markings that define an asymmetric or eccentric arrangement having distinct appearances when the pattern 155 is rotated, and from which unique orientations of the pattern 155 may be unambiguously determined by a human or a computer device or system.

Figure 1C:
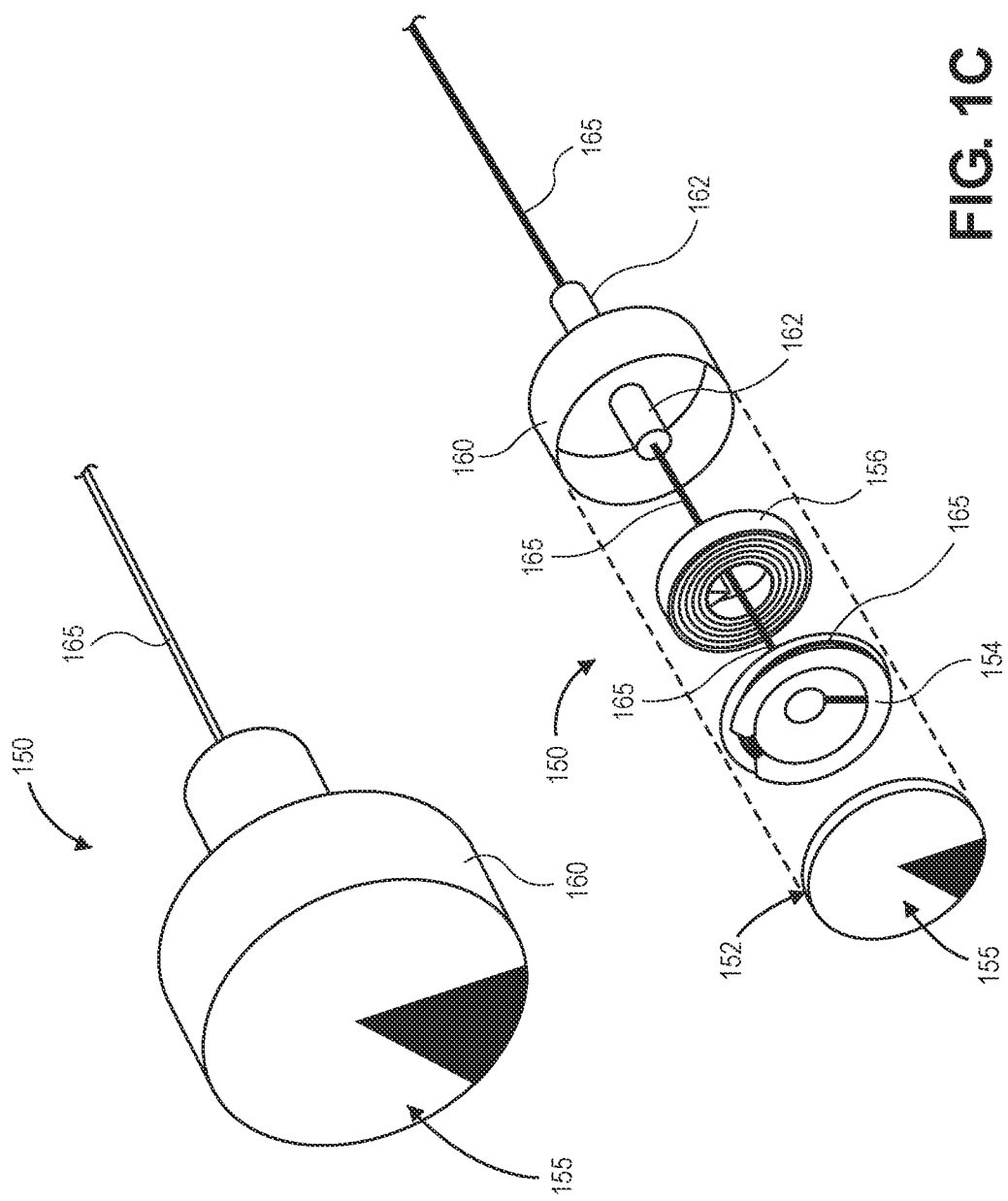

As is shown in FIG. 1C, the counting device 150 includes a housing 160 and a tether 165 extending therefrom. The pattern 155 is provided on a front panel 152 that may be coupled to a reel 154 and a biasing element 156, e.g., to form a subassembly. The tether 165 has one end coupled to the reel 154, and portions that are wrapped around the reel 154, and extended through a bore 162 in the housing 160. Additionally, one end of the biasing element 156 may be coupled to an interior surface of the housing 160, and another end of the biasing element 156, which may be a constant-torque spring, a constant-force spring, or any other element for providing rotational bias, may be coupled to the reel 154, such that the biasing element 156 provides bias or other resistance to rotation of the reel 154 and the front panel 152 coupled thereto in one rotational direction, e.g., clockwise or counter-clockwise.

Figure 1D:
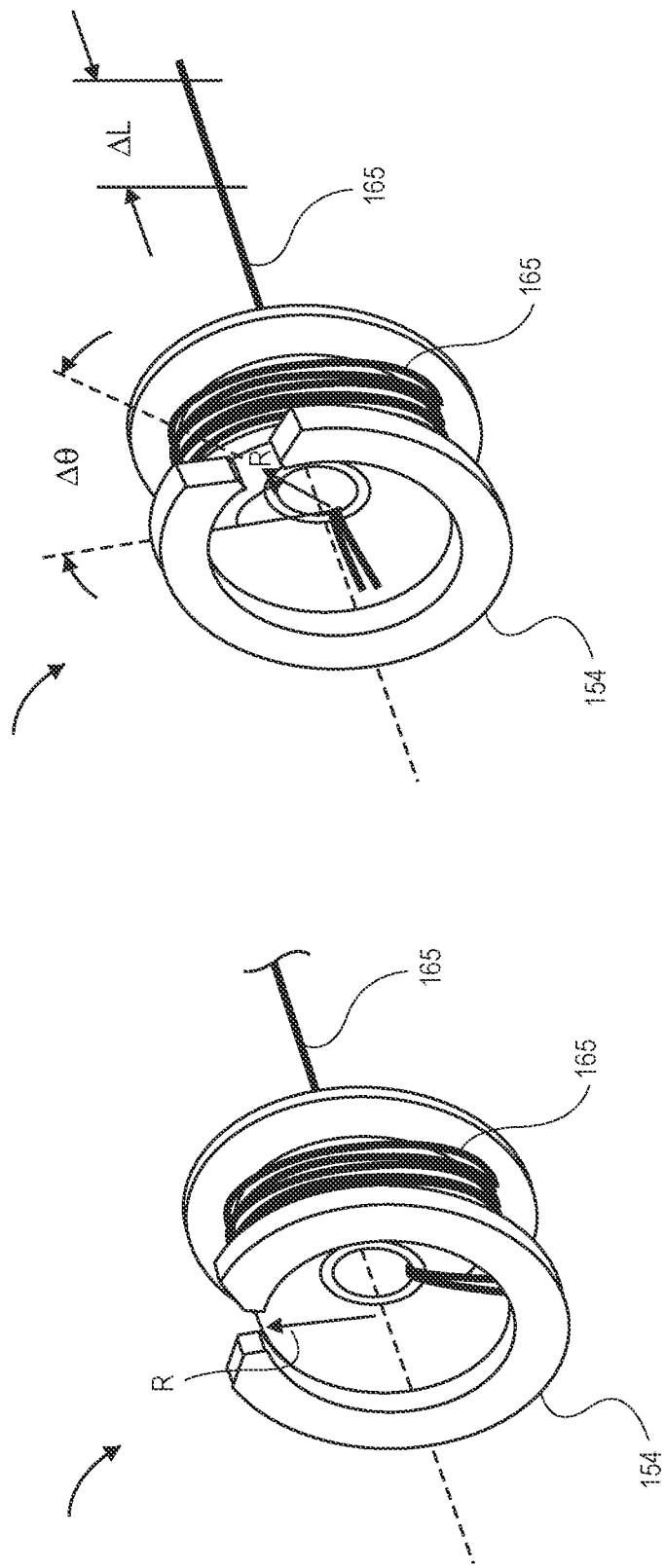

As is shown in FIG. 1D, where tension is applied to the tether 165, a length $\Delta L$ of the tether 165 is withdrawn from the reel 154, and the pusher 130 is moved by a distance equal to the length $\Delta L$. The reel 154, which has a radius R, will rotate about an axis, e.g., an axis parallel to the tether 165 or the track 145, by an angle $\Delta \theta$ in a rotational direction opposite the bias or resistance supplied by the biasing element 156. As is further shown in FIG. 1D, the angle $\Delta \theta$ may be determined based on a ratio of the length $\Delta L$ of the tether 165 that is withdrawn to a circumference of the reel 154, or $2\pi R$.

Figure 1E:
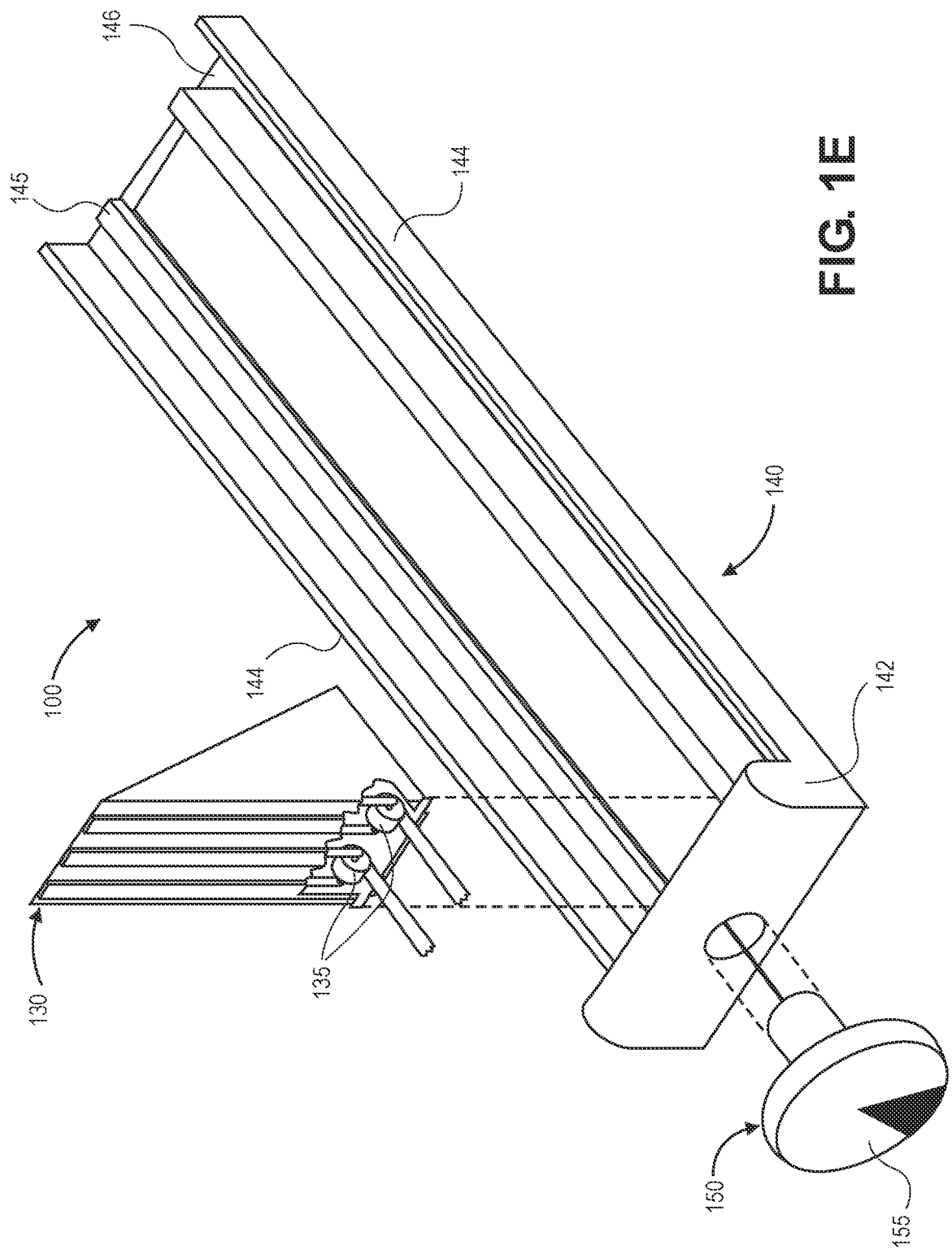

As is shown in FIG. 1E, the pusher 130 includes a pair of biasing elements (e.g., coiled springs) 135 that are joined to the front end 142 of the shelf 140 when the pusher 130 is slidably mounted within the track 145. Each of the biasing elements 135 provides a biasing force (e.g., a restoring force) that urges (e.g., presses, pulls or forces) the pusher 130 toward the front end 142 of the track 145, e.g., according to Hooke's Law, in response to a deflection in an opposite direction away from the front end 142 of the track 145. As is shown in FIG. 1E, the biasing elements 135 may be disposed within a housing or other cavity defined by the pusher 130, and ends of the biasing elements 135 may extend through holes, slots, orifices or other openings of a contact face of the pusher 130. The biasing elements 135 may be mounted to the pusher 130 (e.g., within a housing of the pusher 130, as is shown in FIG. 1E) and joined or otherwise connected to the shelf 140 (e.g., to the front end 142 of the shelf 140) in any manner. Furthermore, in some implementations, such as is shown in FIG. 1E, the biasing elements 135 may act in tension to urge the pusher 130 toward the front end 142 of the track 145. Alternatively, in other implementations, biasing elements may act in compression or any other manner to urge the pusher 130 toward the front end 142 of the track 145, or may be provided in any locations with respect to longitudinal axes of the track 145, e.g., above, below, or alongside such axes, in accordance with the present disclosure.

Additionally, as is also shown in FIG. 1E, the counting device 150 is rotatably mounted into an opening in the front end 142 of the shelf 140. The tether 165 is extended through the opening in the front end 142 of the shelf 140 and joined to a contact face of the pusher 130.

Figure 1F:
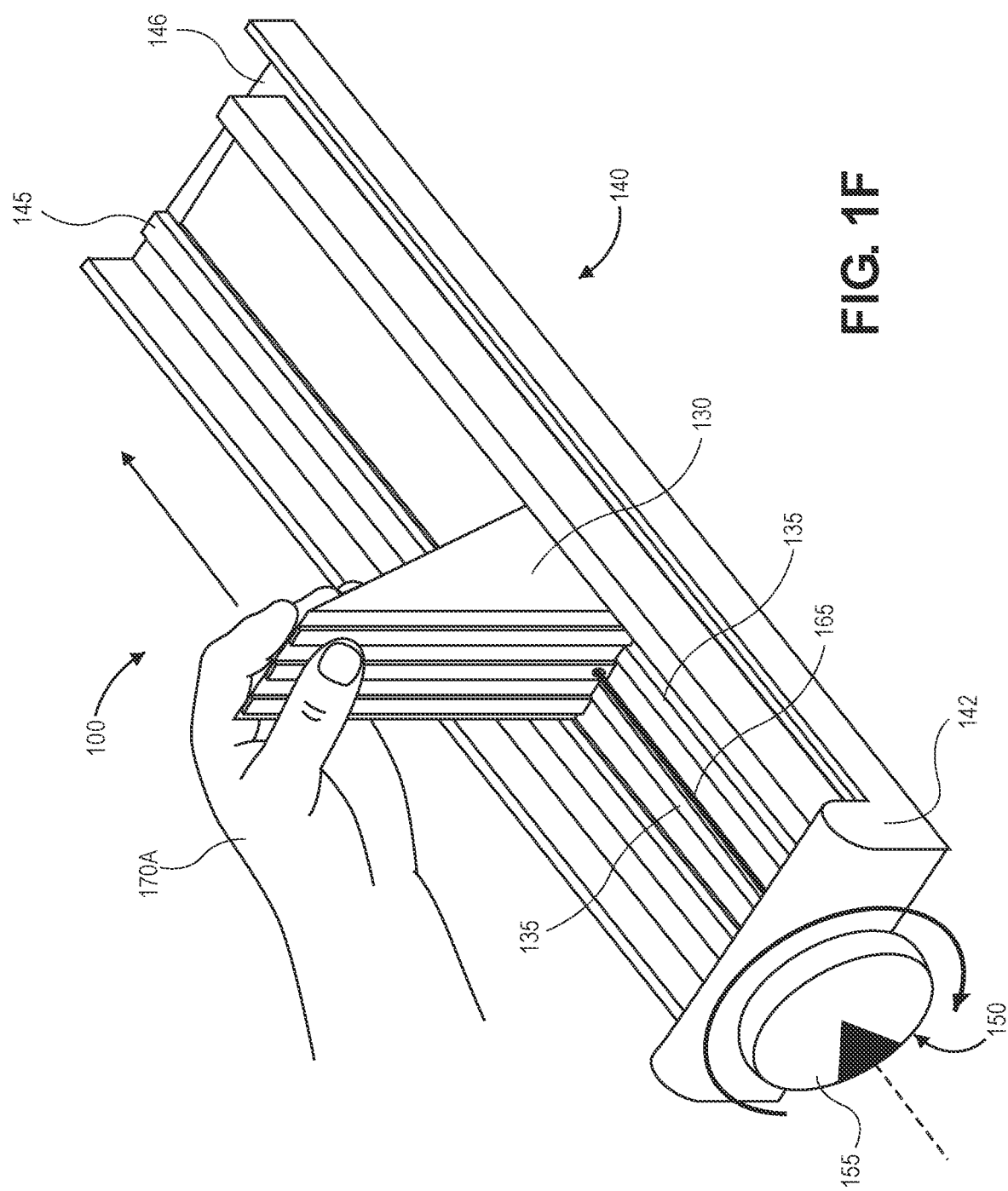

As is shown in FIG. 1F, the pusher 130 is moved laterally away from the front end 142 of the shelf 140, e.g., by a hand 170A of an actor (e.g., an associate or a worker). The movement of the pusher 130 is resisted by the biasing elements 135, and causes the tether 165 to be withdrawn from the counting device 150 via the front end 142 of the shelf 140, which further cause the counting device 150 to rotate about an axis defined by the opening of the front end 142 of the shelf 140 into which the counting device 150 is inserted. The extent of rotation of the counting device 150 about the axis as the pusher 130 is moved laterally away from the front end 142 of the shelf 140 is defined by the length of the tether 165 that is withdrawn therefrom.

Figure 1G:
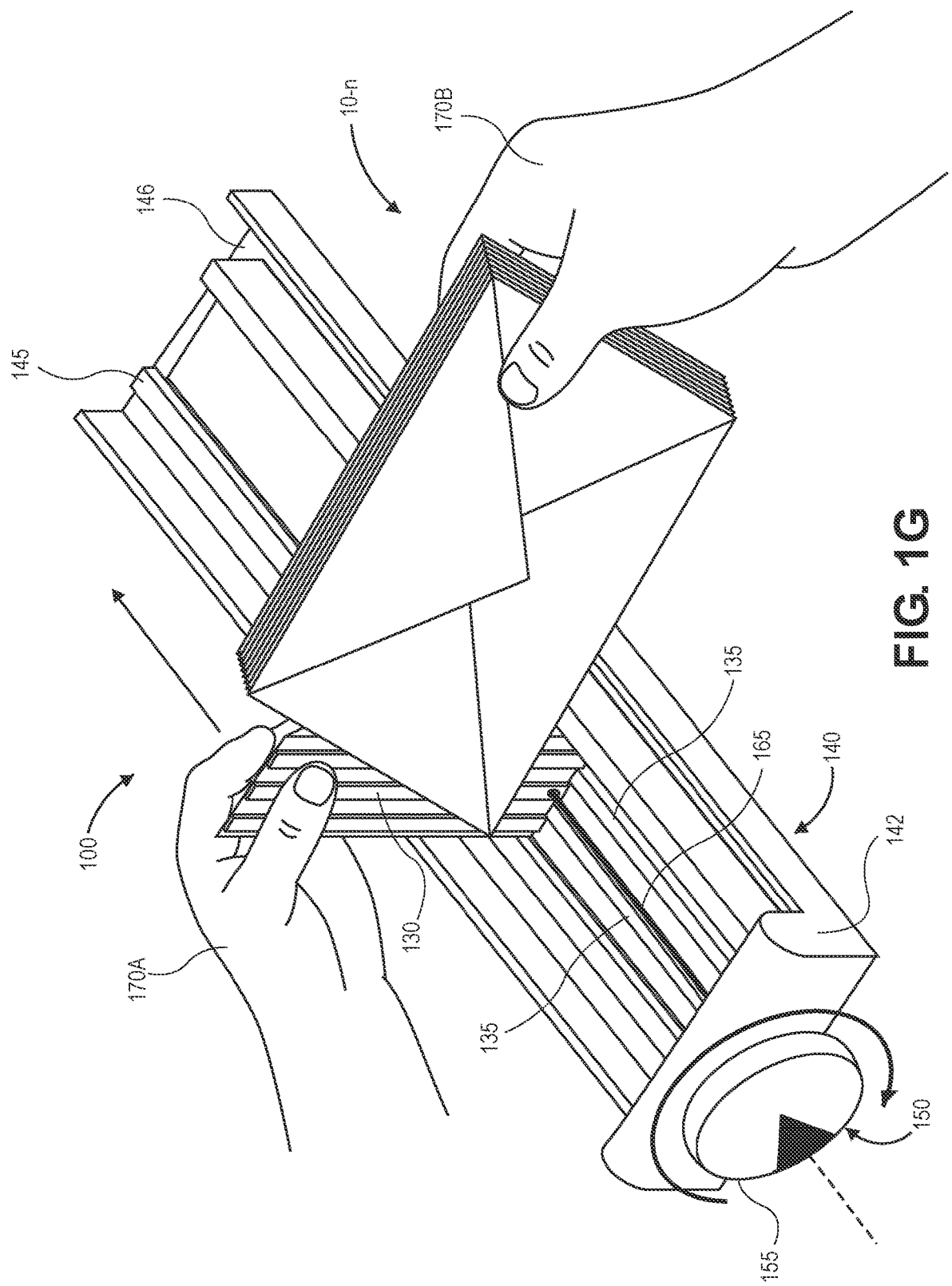
Figure 1H:
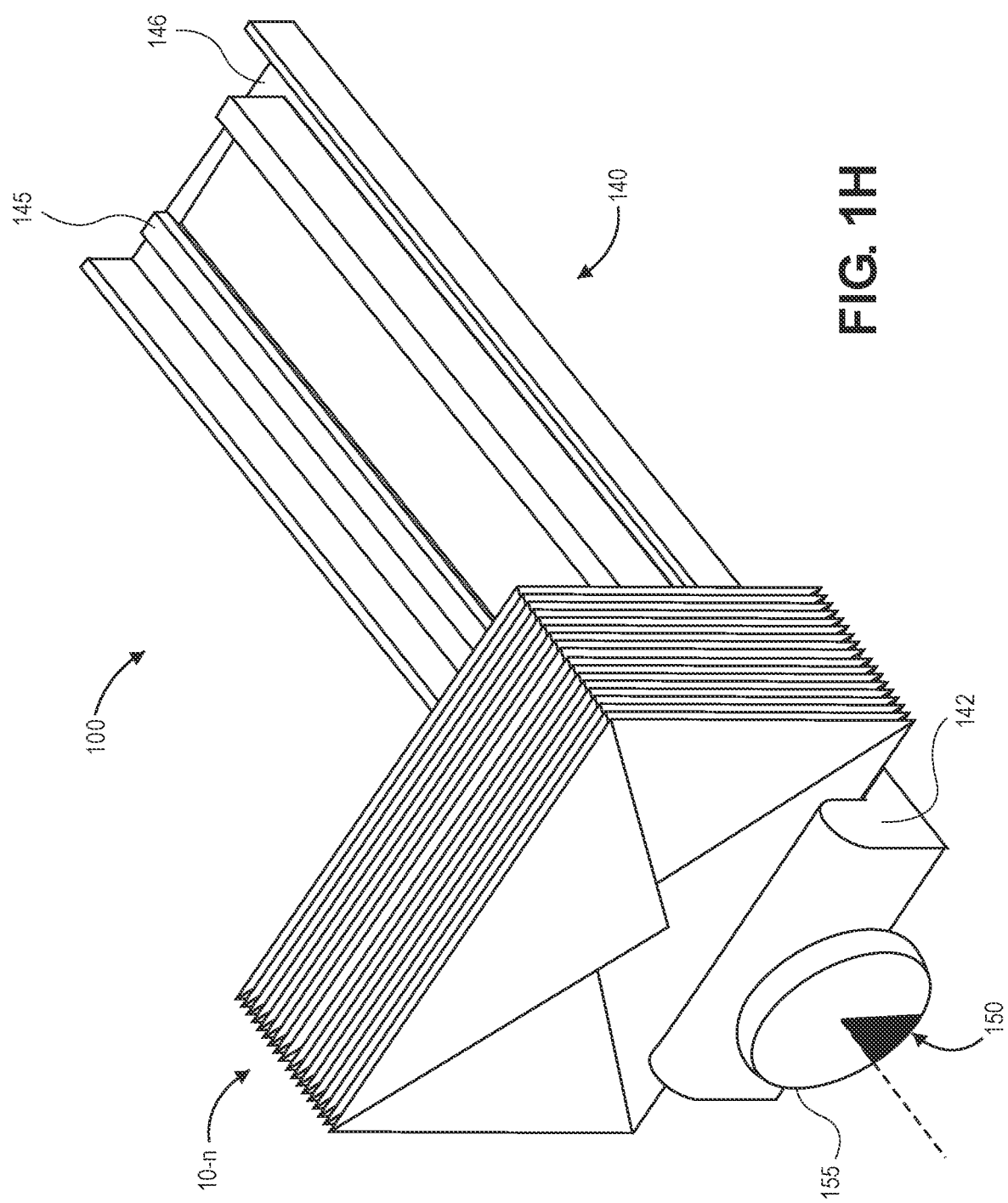

As is shown in FIGS. 1G and 1H, with the pusher 130 moved laterally away from the front end 142 of the shelf 140, a plurality of items 10-$n$ (viz., greeting cards and envelopes) may be inserted into a space between the front end 142 and the pusher 130, e.g., by another hand 170B. For example, where the front end 142 of the shelf 140 includes a raised, physical stop that opposes a contact face of the pusher 130, the plurality of items 10-$n$ may be placed into the space between the front end 142 and the pusher 130, and compressed therebetween when the pusher 130 is released by the hand 170A. The items 10-$n$ may have any size, shape or mass, and may be selected with respect to dimensions of the linear inventory system 100. In some implementations, the items 10-$n$ may be substantially thin, slender or lightweight items or packages thereof, such as gift cards, plant or flower seeds, food products (e.g., snacks, gum, mints or others), books, personal care products, beverages, or other items, or any other items having substantially constant or reliable thicknesses or other dimensions or proportions. After the items 10-$n$ have been inserted into the space between the front end 142 and the pusher 130, biasing forces provided by the biasing elements 135 cause the pusher 130 to withdraw toward the front end 142 of the shelf 140, and compress or otherwise secure the items 10-n therebetween.

In accordance with implementations of the present disclosure, changes in loading on or contents of a shelf, such as the shelf 140, may be represented in changes in orientation of a counting device having a visually distinct surface thereon. Such changes in orientation may be determined from images captured of the visually distinct surface prior to and after the changes in the loading on or the contents of the shelf, and processed to identify a number of items placed on or removed from the shelf. As is shown in FIG. 1I, a camera 120 or other imaging device aligned to include the linear inventory system 100 within a field of view captures an image 125-1 of the shelf 140 with the items 10-n thereon, viz., in the space between the pusher 130 and the front end 142 of the shelf 140. As is further shown in FIG. 1I, a portion of the image 125-1 depicts the pattern 155 on the counting device 150 with the items 10-n thereon.

The camera 120 may be aligned at a distance from the counting device 150, and in an orientation with respect to the counting device 150, that ensures that the counting device 150 and the pattern 155 thereon may be readily detected within images captured by the camera 120. In some implementations, the distance and the orientation of the camera 120 with respect to the counting device 150, or vice versa, may be selected based on one or more attributes of the camera 120, including a level of resolution of the camera 120. Moreover, the camera 120 may be calibrated to detect the pattern 155 within images captured thereby, such as by programming the camera 120 with locations of the pattern 155 within the field of view of the camera 120, or by configuring the camera 120 to detect the pattern 155 within images captured thereby.

Figure 1K:
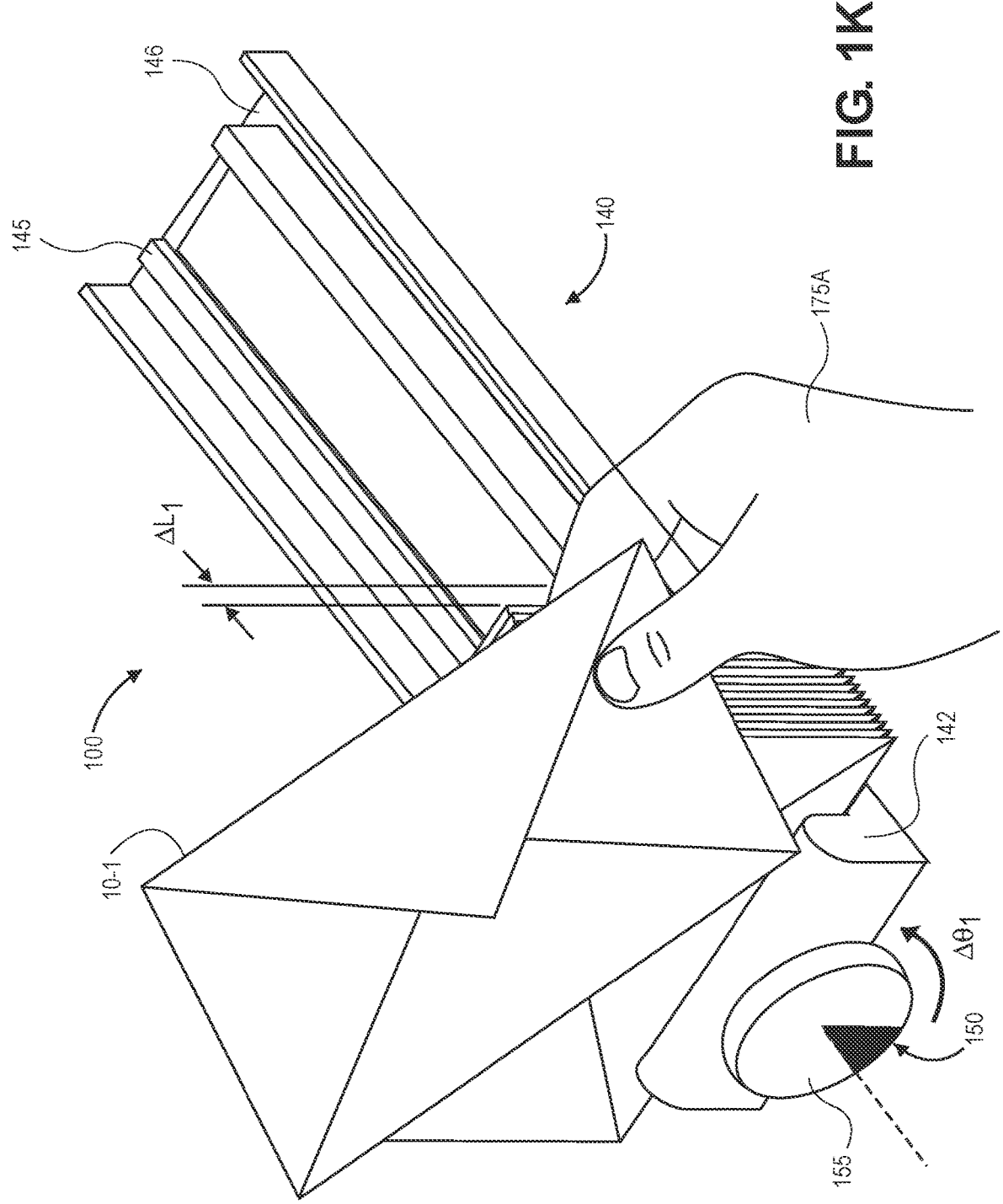

As is shown in FIGS. 1J and 1K, with the items 10-n on the shelf 140, an actor 175 (e.g., a customer) executes one or more movements, poses, gestures or other actions to approach the shelf 140 and retrieve an item 10-1 of the items 10-n from the shelf 140. For example, as is shown in FIG. 1K, a hand 175A of the actor 175 retrieves the item 10-1 of the items 10-n from the shelf 140. An identity of the actor 175 may be known or determined in any manner, such as based on any information or data that may be captured by the imaging device 120 or any other sensors (not shown), and processed by one or more locating services or systems.

Because the pusher 130 is biased toward the front end 142 of the shelf 140, a removal of the item 10-1 causes the pusher 130 to travel toward the front end 142 by a distance $\Delta L_1$, which is substantially equal to a thickness of the item 10-1. Movement of the pusher 130 toward the front end 142 causes the biasing element 156 within the counting device 150 to urge the counting device 150 to rotate in a counter-clockwise direction by an angle $\Delta\theta_1$ that corresponds to the distance $\Delta L_1$ traveled by the pusher 130 toward the front end 142 of the shelf 140. The movement of the pusher 130 by the distance $\Delta L_1$ thereby causes an orientation of the pattern 155 to rotate by the angle $\Delta\theta_1$.

As is shown in FIG. 1L, the camera 120 captures an image 125-2 of the shelf 140 with items 10-(n−1) thereon, e.g., after the item 10-1 has been removed from the space between the pusher 130 and the front end 142 of the shelf 140. As is further shown in FIG. 1L, a portion of the image 125-2 depicts the pattern 155 on the counting device 150 with the items 10-(n−1) thereon, e.g., after the item 10-1 has been removed from the space between the pusher 130 and the front end 142 of the shelf 140.

Figure 1M:
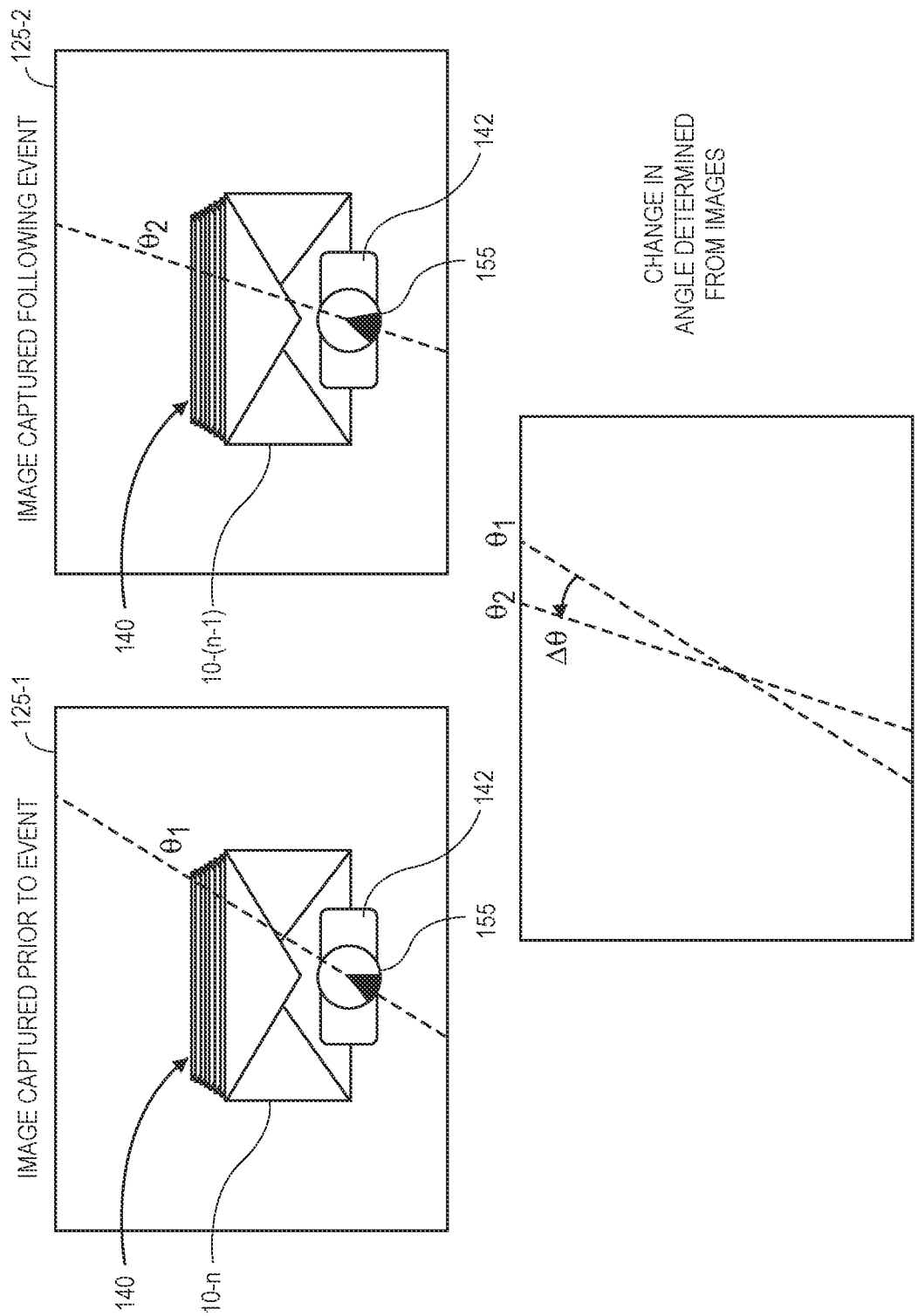

As is shown in FIG. 1M, the image 125-1 captured before the removal of the item 10-1 from the space between the pusher 130 and the front end 142 of the shelf 140 and the image 125-2 captured after the removal of the item 10-1 may be compared to one another in order to determine the change in the orientation of the pattern 155 about an axis, e.g., by the angle $\Delta\theta_1$. For example, the images 125-1, 125-2 may be processed to detect one or more borders, colors, contours, outlines, textures, silhouettes, shapes or other characteristics of image pixels depicting the pattern 155 within each of such images 125-1, 125-2, and to determine orientations of the pattern 155 about the axis within the images 125-1, 125-2, such as with respect to a coordinate system of the images 125-1, 125-2, e.g., with respect to horizontal or vertical arrangements of image pixels within the images 125-1, 125-2.

Once the change in orientation of the pattern 155 about the axis, e.g., the angle $\Delta\theta_1$, is determined, the change in orientation may be associated with the actor 175. The change in orientation of the pattern 155 may be further used as a basis for calculating the distance $\Delta L_1$ traveled by the pusher 130, and a number of the items 10-n removed from the shelf 140, viz., one, may be calculated based on the distance $\Delta L_1$ and stored in one or more data stores. For example, a number of the items 10-n may be calculated by dividing the distance $\Delta L_1$ traveled by the pusher 130 by a thickness of one of the items 10-n, such that the number of the items 10-n is determined to be approximately the quotient.

Accordingly, the systems and methods of the present disclosure may be directed to determining inventory levels on shelves or other storage units at a materials handling facility using rotatable counting devices and visual imagery. The counting devices may include one or more surfaces having patterns or other visually distinct markings thereon, and such surfaces may be configured to rotate with respect to positions of pushers or other systems on the shelves or other storage units. Images captured of the counting devices at various times may be processed to visually determine an orientation of the patterns or other markings about an axis depicted therein. A change in an orientation of a pattern or other marking, detected from two or more of such images, may be used to determine a change in loading on or the contents of a shelf or another storage unit. Such changes in loading or contents may be associated with an actor who is known to be present at a materials handling facility including the shelf or the other storage unit.

The counting devices of the present disclosure may be any systems or components that are configured to visibly identify or express a status of a shelf by a rotatable component having a pattern or other visible marking thereon. The counting devices may be rotatably coupled to a shelf or other storage unit in a manner that causes the pattern or other visible marking to rotate in either rotational direction, e.g., clockwise or counter-clockwise, within a field of view of a camera based on a change in a linear position of a pusher or other system within a track or other system provided on the shelf or other storage unit. Therefore, the counting devices of the present disclosure need not require electrical power in order to visually indicate statuses of shelves or other storage units, or changes in such statuses, and may be readily installed on any number of surfaces associated with a storage unit (e.g., a shelving unit, a temperature-controlled cooler or other container, a gondola rack), a wall, a ceiling or any other aspect of a materials handling facility.

Moreover, any number of counting devices may be mounted in association with any number of shelves or other storage units, within a field of view of a camera, and images captured by the camera may be processed to visually determine statuses of the shelves or other storage units. For example, where a display unit, a housing, a frame, or another structure or component having a plurality of shelves arranged in horizontal and/or vertical spatial arrangements with respect to one another, images captured by a camera at any frame rate may be processed to determine orientations of patterns or other markings of counting devices provided in association with such shelves. The orientations, or changes in such orientations, may be detected and processed to determine statuses of any of the shelves (e.g., loading on or contents of the shelves), or changes in such statuses. In some implementations, a shelf or another storage unit may include a plurality of item spaces (or lanes, or product spaces), each of which may be associated with a discrete type or kind of product. Each of the item spaces may include a pusher provided in a track that is biased toward an end of the shelf or storage unit and a counting device of the present disclosure provided in association with the end of the shelf. Images captured of the shelf or storage unit may be processed to determine orientations, or changes in orientations, of patterns or other markings of such counting devices. The images may be captured by a single camera, or by any number of cameras, and processed accordingly.

In accordance with implementations of the present disclosure, one or more cameras may be mounted in association with a counting device, and in locations and orientations with respect to the counting device, that ensure that the counting device and any patterns or markings thereon may be readily detected within images captured by the cameras. In some implementations, the locations and the orientations may be selected based on one or more attributes of the cameras, including but not limited to levels of resolution of the cameras. Moreover, the cameras may be calibrated to detect patterns or markings within images captured thereby, such as by programming the cameras with locations of the patterns or markings within the field of view of the cameras, or by configuring the cameras to detect the patterns or markings within images captured thereby. For example, upon mounting or installing a camera with respect to a linear storage unit having a counting device of the present disclosure within a field of view of the camera, or upon completing maintenance, repairs or inspections of the linear storage unit or the counting device, or loading items onto or removing items from the linear storage unit, an image captured of the counting device may be compared to a front view image of a pattern or marking on the counting device. Based on the comparison, a location, a size or an orientation of the image within the image plane of the camera, or within images captured by the camera, may be determined, and the camera or a computer system in communication with the camera may be calibrated to detect the counting device therein and to determine an orientation of the pattern or marking thereon with respect to an axis of the counting device.

The rotatable components of the counting devices disclosed herein may be configured to rotate about axes that are aligned in any orientation with respect to shelves or others storage units with which the counting devices are associated. For example, where a shelf or other storage unit is aligned substantially horizontally, a rotatable component having a pattern or other visible marking thereon may be configured to rotate about an axis that is also aligned substantially horizontally, such as is shown in FIGS. 1A through 1M, or about an axis that is aligned vertically or at any other angle with respect to the shelf or other storage unit. In some implementations, a rotatable component of a counting device of the present disclosure may be aligned substantially horizontally, and configured to rotate about a vertical axis, above a shelf or other storage unit with which the counting device is associated. A camera that is provided above a space of a materials handling facility within which the shelf or other storage unit is provided, or is substantially elevated above the space, may include the rotatable component within a field of view, and images captured by the camera may be processed to determine orientations of a pattern or other visible marking on the rotatable component, or changes in such orientations.

Moreover, in some implementations, a shelf or other storage unit may have two or more rotatable components of counting devices associated with a pusher or other movable system. Such rotatable components may be configured to rotate at different rates or frequencies with respect to changes in position of the pusher or the movable system. For example, in a manner akin to that of a traditional clock, which includes minute and hour hands that rotate on a common face once every hour or once every twelve hours, respectively, a counting device of the present disclosure may have one rotatable component with one pattern or other visible marking thereon that rotates at one rate with respect to changes in position of a pusher or another movable system, and another rotatable component with another pattern or visible marking thereon that rotates at another rate with respect to the same changes in position of the pusher or the other movable system. Thus, images captured by a camera holding the patterns or visible markings within a field of view may be processed to determine orientations of each of the patterns or visible markings, or changes in such orientations, and the changes may be further used as a basis for determining a change in the position of the pusher or the other movable system, and a number of items placed on or removed from the shelf accordingly. Furthermore, in some implementations, a shelf or another storage unit may be outfitted with two or more counting devices, which may have rotatable components that appear within fields of view of two or more cameras, and each of which may be configured to rotate about axes that need not be parallel nor perpendicular to one another. For example, a shelf or another storage unit may have a first counting device with a first rotatable component within a field of view of a first camera, and a second counting device with a second rotatable component within a field of view of a second camera, or any number of counting devices having rotatable components within fields of view of any number of cameras.

The patterns or markings of the present disclosure may include any number of lines, shapes, colors, textures, alphanumeric characters, symbols or the like, defining arrangements from which unique orientations of the patterns or markings may be unambiguously determined by a human or a computer device or system. In some implementations, a change in orientations of a pattern or another marking on a counting device associated with a shelf in a materials handling facility may be determined and associated with an actor who is known to be within the materials handling facility, and used to determine a number of items taken from the shelf or placed on the shelf by the actor. In some other implementations, actors at a materials handling facility may be identified in any manner, and based on any information or data captured by cameras or other sensors. Numbers of items associated with interactions may be associated with actors who are determined to have executed such interactions accordingly. For example, in some implementations, where an actor is known to be present within a materials handling facility, such as based on images captured by one or more cameras or other imaging devices, and a position of the actor is determined to be at or within a close proximity of a shelf or other storage unit having a counting device of the present disclosure mounted in association therewith, changes in orientation that are detected based on images captured of the counting device by one or more cameras may be processed to determine changes in orientation of a pattern or other visible marking on the counting device, and also to detect the actor within such images.

The counting devices disclosed herein may be formed from any suitable materials in accordance with the present disclosure. For example, the counting devices may include housings, panels or other surfaces formed from metals (e.g., steels, aluminums, or others), plastics (e.g., polyacrylates or polyethylenes of various densities), composites, or any other materials. In some implementations, the counting devices may include patterns or other markings provided on one or more of such housings, panels or other surfaces that are applied by ink, decals, paints, stickers or any other substances or materials. Moreover, in some implementations, the patterns or other markings may be contained within or covered with one or more translucent (partially translucent) components or materials. The counting devices may further include tethers, tension members or other systems for coupling to pushers or other movable systems of shelves or other storage units that are formed from natural or artificial fibers or materials, e.g., nylons, or any chains or other serial assemblies of connected sections (e.g., links). Moreover, the counting devices may include biasing elements of any type or form, including but not limited to constant-torque springs, constant-force springs, extension springs, torsion springs, compression springs, conical springs, disc springs, helical springs, leaf springs or any other systems. Components of the counting devices of the present disclosure may be assembled or joined in any manner, such as by clips, glues, adhesives or any other technique.

Likewise, the linear inventory systems of the present disclosure may be formed from any suitable materials. For example, in some implementations, the pushers, tracks, shelves or other features of the linear inventory systems may be formed from any sufficiently durable materials such as plastics (e.g., thermosetting plastics such as epoxy or phenolic resins, polyurethanes or polyesters, as well as polyethylenes, polypropylenes or polyvinyl chlorides), wood (e.g., woods with sufficient strength properties such as ash), metals (e.g., lightweight metals such as aluminum, or metals of heavier weights including alloys of steel), composites or any other combinations of materials. The pushers may also include any other type or form of biasing elements, including one or more systems for providing magnetic bias in one direction or away from another direction. In some implementations, a biasing element may, but need not, be used to urge (or press, push or force) a pusher toward a specific position, e.g., toward one end of a track. Additionally, shelves, storage units or other aspects of the linear inventory systems of the present disclosure may further include any extensions, channels, pistons, rails, guides, bearings or other components for receiving pushers therein. Moreover, in some implementations, inventory systems of the present disclosure need not be "linear," i.e., straight. For example, in some implementations, a sensing system may include one or more tracks or pushers that are arranged in an arcuate or other curvilinear manner, and configured to determine positions of the pushers along such arcuate or other curvilinear tracks.

Where a specific item or type of item has a constant and substantially reliable dimension, e.g., a depth or a thickness, a number of the specific item or type of item may be uniformly stacked or stored in series between a pusher and an end of a shelf or another storage unit. The pushers of the present disclosure may include flat faces, such as is shown in FIGS. 1A, 1B or 1E through 1G, for coming into direct contact with surfaces of one or more items of any type or kind. Alternatively, the pushers may have non-flat surfaces, e.g., rounded, angled or tapered surfaces for coming into direct contact with surfaces of one or more items. In some implementations, faces or surfaces of pushers may be specifically selected to correspond to one or more attributes of an item to be stored therein. For example, where an item having a rounded, spherical, cylindrical or other curved surface is to be stored within or on a storage unit having one or more of the linear inventory systems disclosed herein, one of the linear inventory systems may be outfitted with a pusher having one or more faces or surfaces that may receive the curved surface of the item therein. Moreover, the pushers may be sufficiently durable, and may take the form of triangular solids or hollows, such as is shown in FIGS. 1A, 1B or 1E through 1G, or any other shape of any other solid or hollow. For example, the pushers may take the form of hollow rings, triangles, squares, lines or other shapes.

Those of ordinary skill in the pertinent arts will recognize that imaging data, e.g., visual imaging data, may be captured using one or more cameras or other imaging devices such as digital cameras, depth sensors, range cameras, infrared cameras or radiographic cameras. Such devices generally operate by capturing light that is scattered or reflected from objects, and by subsequently calculating or assigning one or more quantitative values to aspects of the scattered or reflected light, e.g., image pixels, then generating an output based on such values, and storing such values in one or more data stores. For example, a camera may include one or more image sensors (e.g., a photosensitive surface with a plurality of pixel sensors provided thereon), having one or more filters associated therewith. Such sensors may detect information regarding aspects of any number of image pixels of the scattered or reflected light corresponding to one or more base colors (e.g., red, green or blue) of the scattered or reflected light, or distances to objects from which the light was scattered or reflected. Such sensors may then generate data files including such information, and store such data files in one or more onboard or accessible data stores (e.g., a hard drive or other like component), or in one or more removable data stores (e.g., flash memory devices). Such data files may also be printed, displayed on one or more broadcast or closed-circuit television networks, or transmitted over a computer network such as the Internet.

An imaging device that is configured to capture and store visual imaging data (e.g., color images) is commonly called an RGB ("red-green-blue") imaging device (or camera), while an imaging device that is configured to capture both visual imaging data and depth imaging data (e.g., ranges) is commonly referred to as an RGBz or RGBD imaging device (or camera). Imaging data files may be stored in any number of formats, including but not limited to .JPEG or .JPG files, or Graphics Interchange Format (or ".GIF"), Bitmap (or ".BMP"), Portable Network Graphics (or ".PNG"), Tagged Image File Format (or ".TIFF") files, Audio Video Interleave (or ".AVI"), QuickTime (or ".MOV"), Moving Picture Experts Group (or ".MPG," ".MPEG" or ".MP4") or Windows Media Video (or ".WMV") files.

Scattered or reflected light may be captured or detected by an imaging device if the light is within the device's field of view, which is defined as a function of a distance between a sensor and a lens within the device, viz., a focal length, as well as a location of the device and an angular orientation of the device's lens. Accordingly, where an object appears within a depth of field, or a distance within the field of view where the clarity and focus is sufficiently sharp, an imaging device may capture light that is scattered or reflected off objects of any kind to a sufficiently high degree of resolution using one or more sensors thereof, and store information regarding the scattered or reflected light in one or more data files.

Information and/or data regarding features of objects expressed in imaging data, including borders, colors, contours, outlines, textures, silhouettes, shapes or other features of objects, may be extracted from the data in any number of ways. For example, colors of image pixels, or of groups of image pixels, in a digital image may be determined and quantified according to one or more standards, e.g., the RGB color model, in which the portions of red, green or blue in an image pixel are expressed in three corresponding numbers ranging from 0 to 255 in value, or a hexadecimal model, in which a color of an image pixel is expressed in a six-character code, wherein each of the characters may have a range of sixteen. Colors may also be expressed according to a six-character hexadecimal model, or #NNNNNN, where each of the characters N has a range of sixteen digits (i.e., the numbers 0 through 9 and letters A through F). The first two characters NN of the hexadecimal model refer to the portion of red contained in the color, while the second two characters NN refer to the portion of green contained in the color, and the third two characters NN refer to the portion of blue contained in the color. For example, the colors white and black are expressed according to the hexadecimal model as #FFFFFF and #000000, respectively, while the color National Flag Blue is expressed as #002868. Any means or model for quantifying a color or color schema within an image or photograph may be utilized in accordance with the present disclosure. Moreover, textures or features of objects expressed in a digital image may be identified using one or more computer-based methods, such as by identifying changes in intensities within regions or sectors of the image, or by defining areas of an image corresponding to specific surfaces.

Furthermore, borders, colors, contours, outlines, textures, silhouettes, shapes or other characteristics of objects, or portions of objects, expressed in still or moving digital images may be identified using one or more algorithms or machine-learning tools. The objects or portions of objects may be stationary or in motion, and may be identified at single, finite periods of time, or over one or more periods or durations (e.g., intervals of time). Such algorithms or tools may be directed to recognizing and marking transitions (e.g., the borders, colors, contours, outlines, textures, silhouettes, shapes or other characteristics of objects or portions thereof) within the digital images as closely as possible, and in a manner that minimizes noise and disruptions, and does not create false transitions. Some detection algorithms or techniques that may be utilized in order to recognize characteristics of objects or portions thereof in digital images in accordance with the present disclosure include, but are not limited to, Canny detectors or algorithms; Sobel operators, algorithms or filters; Kayyali operators; Roberts detection algorithms; Prewitt operators; Frei-Chen methods; or any other algorithms or techniques that may be known to those of ordinary skill in the pertinent arts. For example, objects or portions thereof expressed within imaging data may be associated with a label or labels according to one or more machine learning classifiers, algorithms or techniques, including but not limited to nearest neighbor methods or analyses, artificial neural networks, support vector machines, factorization methods or techniques, K-means clustering analyses or techniques, similarity measures such as log likelihood similarities or cosine similarities, latent Dirichlet allocations or other topic models, or latent semantic analyses.

As used herein, the term "materials handling facility" may include, but is not limited to, warehouses, distribution centers, cross-docking facilities, order fulfillment facilities, packaging facilities, shipping facilities, rental facilities, libraries, retail stores or establishments, wholesale stores, museums, or other facilities or combinations of facilities for performing one or more functions of material or inventory handling for any purpose. For example, in some implementations, one or more of the systems and methods disclosed herein may be used to detect interactions within a materials handling facility, including but not limited to interactions with one or more items (e.g., consumer goods) within the materials handling facility.

Figure 2:
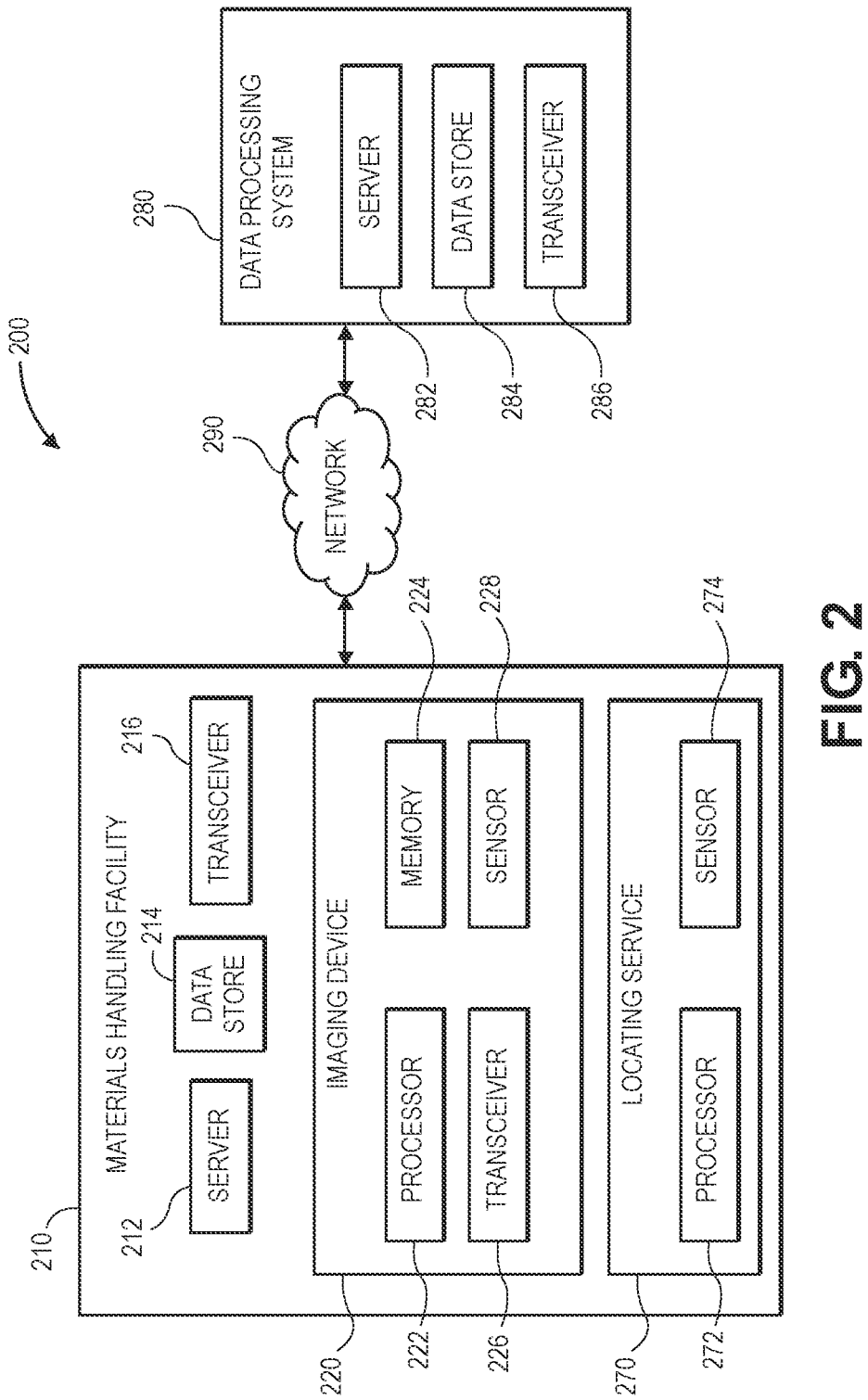
FIG. 2 is a block diagram of components of one system for determining inventory levels in accordance with implementations of the present disclosure.

Referring to FIG. 2, a block diagram of components of one system 200 for determining inventory levels in accordance with implementations of the present disclosure is shown. The system 200 includes a materials handling facility 210 and a data processing system 280 having one or more computer devices or components that are connected to one another across a network 290, which may include the Internet in whole or in part. The materials handling facility 210 further includes an imaging device 220 and a locating service 270. Except where otherwise noted, reference numerals preceded by the number "2" shown in FIG. 2 indicate components or features that are similar to components or features having reference numerals preceded by the number "1" shown in FIGS. 1A through 1M.

The materials handling facility 210 may be any facility that is adapted to receive, store, process and/or distribute items from a variety of sources to a variety of destinations on behalf of any entity, including but not limited to an electronic marketplace. The materials handling facility 210 may be configured to receive any type or kind of inventory items from various sources, to store the inventory items until a user orders or retrieves one or more of the items, or to distribute the inventory items to the user. For example, inventory items such as merchandise, commodities, perishables or any other type of item may be received from one or more suppliers, e.g., manufacturers, distributors, wholesalers, vendors or the like, at the materials handling facility 210. Upon their arrival at the materials handling facility 210, the inventory items may be prepared for storage, such as by unpacking or otherwise rearranging the inventory items, and updating one or more records to reflect the types, quantities, conditions, costs, locations or any other parameters associated with the arrival of the inventory items. Subsequently, the inventory items may be stocked, managed or dispensed in terms of countable, individual units or multiples of units, such as packages, cartons, crates, pallets or other suitable aggregations. Alternatively, one or more of the items, such as bulk products, commodities, or the like, may be stored in continuous or arbitrarily divisible amounts that may not be inherently organized into countable units, and may instead be managed in terms of measurable quantities such as units of length, area, volume, weight, time duration or other dimensional properties characterized by units of measurement.

As is shown in FIG. 2, the materials handling facility 210 includes a networked computer infrastructure for performing various computer-related functions associated with the receipt, storage, processing and distribution of such items, including one or more physical computer servers 212, data stores (e.g., databases) 214 and/or transceivers 216, that may be provided in the same physical location as the materials handling facility 210, or in one or more alternate or virtual locations, e.g., in a "cloud"-based environment. The servers 212 may include one or more processors or other systems for executing any instructions or for performing any functions or applications disclosed herein. The data stores 214 may have any relevant information or data stored thereon, and may be configured to receive and store any further information or data thereon. The transceivers 216 may be configured to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, or any other technologies or protocols, over the network 290 or in any other manner.

In some implementations, the servers 212, the data stores 214 and/or the transceivers 216 or any number of other computing devices or resources may further execute any type of computer-based function or compute any type or form of calculation, including but not limited to any formulas, equations, algorithms or techniques for determining one or more probabilities or performing any number of statistical tests. The materials handling facility 210 may operate one or more order processing and/or communication systems using computer devices or resources in communication with one or more of the servers 212, the data stores 214 and/or the transceivers 216, or through one or more other computing devices or resources that may be connected to the network 290, in order to transmit or receive information in the form of digital or analog data, or for any other purpose.

The servers 212, the data stores 214 and/or the transceivers 216 may be configured to process imaging data received from the imaging device 220, and to detect or recognize any patterns or markings depicted within the imaging data. The servers 212, the data stores 214 and/or the transceivers 216 may be further configured to determine a number of inventory items placed on a shelf or another storage unit within the materials handling facility 210 based on changes in orientation of a pattern or other marking depicted within imaging data, and to update any records regarding such inventory items accordingly. In some implementations, the servers 212, the data stores 214 and/or the transceivers 216 may be configured to execute one or more machine learning systems or techniques. For example, in some implementations, the servers 212 may be configured to execute an artificial neural network, such a convolutional neural network, to process imaging data received from the imaging device 220.

Alternatively, in some implementations, any of the processing tasks or functions described herein as being performed by one or more of the servers 212, the data stores 214 and/or the transceivers 216 may also be performed by one or more processors or processor units provided aboard the imaging device 220, e.g., the processor 222. For example, in some implementations, the imaging device 220 may capture one or more images of a shelf or another storage unit, detect a pattern or other marking on a countable device depicted within such images, and generate or update one or more sets of information or data regarding numbers of items provided on the shelf or other storage unit accordingly. The imaging device 220 may then transmit such information or data to the servers 212, the data stores 214 and/or the transceivers 216 over the network 290, e.g., via a wired connection, wirelessly, or in any other manner, and may further generate or update one or more records regarding numbers of items provided on the shelf or other storage unit or elsewhere accordingly.

The materials handling facility 210 may include one or more inventory areas having predefined two-dimensional or three-dimensional storage units for accommodating items and/or containers of such items, such as aisles, rows, bays, shelves, slots, bins, racks, tiers, bars, hooks, cubbies or other like storage means, or any other appropriate regions or stations, which may be flat or angled, stationary or mobile, and of any shape or size. Additionally, as is discussed above, the materials handling facility 210 may further include one or more receiving stations featuring any apparatuses that may be required in order to receive shipments of items at the materials handling facility 210 from one or more sources and/or through one or more channels, including but not limited to docks, lifts, cranes, jacks, belts or other conveying apparatuses for obtaining items and/or shipments of items from carriers such as cars, trucks, trailers, freight cars, container ships or cargo aircraft (e.g., manned aircraft or unmanned aircraft, such as drones), and preparing such items for storage or distribution to customers. The materials handling facility 210 may further include one or more distribution stations where items that have been retrieved from a designated inventory area may be evaluated, prepared and packed for delivery from the materials handling facility 210 to addresses, locations or destinations specified by customers, also by way of carriers such as cars, trucks, trailers, freight cars, container ships or cargo aircraft (e.g., manned aircraft or unmanned aircraft, such as drones).

The imaging device 220 (or other sensor) may be any form of optical recording device that may be used to photograph or otherwise record imaging data, including visual imaging data (e.g., color, grayscale or black-and-white images), depth imaging data, or any other type of imaging data. For example, in some implementations, the imaging device 220 may be an RGB color camera, a still camera, a motion capture/video camera or any other type or form of camera. In other implementations, the imaging device 220 may be a thermographic or infrared (IR) camera. Additionally, the imaging device 220 may be mounted in any specific location or orientation within the materials handling facility 210, and may hold one or more counting devices of the present disclosure within a field of view.

As is shown in FIG. 2, the imaging device 220 includes one or more processors 222, one or more memory components 224, one or more transceivers 226 and one or more sensors 228. The processors 222 may be configured to process imaging data captured by the imaging device 220, such as by executing any number of detection or recognition algorithms, including but not limited to one or more artificial neural networks, e.g., convolutional neural networks. The memory components 224 may be configured to receive and store any type of information or data thereon, including but not limited to images of any type or form. The transceivers 226 may be configured to enable the imaging device 220 to communicate to one or more of the server 212, the data store 214 or the transceiver 216 through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, or any other technologies or protocols. In some implementations, the transceivers 226 may be further configured to enable the imaging device 220 to communicate to one or more external computer devices or systems, e.g., over the network 290.

The sensors 228 may include color sensors (or grayscale sensors or black-and-white sensors) and/or depth sensors for capturing visual imaging data (e.g., textures) or depth imaging data regarding objects within the field of view of the imaging device 220. For example, the sensors 228 may capture one or more still or moving images (e.g., streams of visual and/or depth images or image frames), along with any relevant audio signals or other information (e.g., position data), which may be shared with one or more external computer devices via the transceiver 226 over the network 290, through the sending and receiving of digital data.

The imaging device 220 may include one or more other sensors, memory or storage components and processors to capture, analyze and/or store imaging data, and such sensors, memory components or processors may further include one or more photosensitive surfaces, filters, chips, electrodes, clocks, boards, timers or any other relevant features (not shown).

The imaging device 220 may also include manual or automatic features for modifying its field of view or orientation. For example, the imaging device 220 may be configured in a fixed position, or with a fixed focal length (e.g., fixed-focus lenses) or angular orientation. Alternatively, the imaging device 220 may include one or more motorized features for adjusting a position of the imaging device, or for adjusting either the focal length (e.g., zooming the imaging device) or the angular orientation (e.g., the roll angle, the pitch angle or the yaw angle), by causing changes in the distance between the sensor and the lens (e.g., optical zoom lenses or digital zoom lenses), changes in the location of the imaging device 220 or changes in one or more of the angles defining the angular orientation.

For example, the imaging device 220 may be hard-mounted to a support or mounting that maintains the device in a fixed configuration or angle with respect to one, two or three axes. Alternatively, however, the imaging device 220 may be provided with one or more motors and/or controllers for manually or automatically operating one or more of the components, or for reorienting the axis or direction of the device, i.e., by panning or tilting the device. Panning the imaging device 220 may cause a rotation within a horizontal axis or about a vertical axis (e.g., a yaw), while tilting an imaging device may cause a rotation within a vertical plane or about a horizontal axis (e.g., a pitch). Additionally, the imaging device 220 may be rolled, or rotated about its axis of rotation, and within a plane that is perpendicular to the axis of rotation and substantially parallel to a field of view of the imaging device 220.

Although the system 200 of FIG. 2 includes a single box corresponding to an imaging device 220, those of ordinary skill in the pertinent arts will recognize that any number or type of imaging devices may be provided in association with the materials handling facility 210 in accordance with the present disclosure, and that such strips and display units may have any number of switches or indicators, respectively. For example, in some implementations, the materials handling facility 210 may be associated with dozens or even hundreds of strips and display units.

The materials handling facility 210 may also include any number of other sensors, components or other features for controlling or aiding in the operation of the materials handling facility 210, including but not limited to one or more thermometers, barometers, hygrometers, gyroscopes, air monitoring sensors (e.g., oxygen, ozone, hydrogen, carbon monoxide or carbon dioxide sensors), ozone monitors, pH sensors, magnetic anomaly detectors, metal detectors, radiation sensors (e.g., Geiger counters, neutron detectors, alpha detectors), laser sensors, weight sensors, attitude sensors, depth gauges, accelerometers, or sound sensors (e.g., microphones, piezoelectric sensors, vibration sensors or other transducers for detecting and recording acoustic energy from one or more directions).

The materials handling facility 210 may also include one or more human operators (not shown), such as one or more workers, who may be any designated personnel tasked with performing one or more tasks within the materials handling facility 210 in general, or within one or more inventory areas, receiving stations, distribution stations or other locations of the materials handling facility 210 in particular. Such workers may handle or transport items (e.g., any type or form of good, product, media or other tangible consumer article) within the materials handling facility 210, or operate one or more pieces of equipment therein (not shown). Such workers may also operate one or more specific computing devices or resources for registering the receipt, retrieval, transportation or storage of items within the materials handling facility 210, e.g., a general purpose device such as a personal digital assistant, a digital media player, a smartphone, a tablet computer, a desktop computer or a laptop computer (not shown), which may include any form of input and/or output peripherals such as scanners, readers, keyboards, keypads, touchscreens or like devices.

In some implementations, the imaging device 220 and the server 212, the data stores 214 or the transceivers 216 may be provided in a common physical area or space of the materials handling facility 210, e.g., within any type of retail store or establishment, or outside of or adjacent to the physical area or space of the materials handling facility 210.

The locating service 270 includes one or more processors 272 and one or more sensors 274 for detecting the presence or absence of one or more actors within the materials handling facility 210, and locating one or more movements, poses, gestures or other actions executed by such actors within the materials handling facility 210. The processors 272 may be provided in the same physical location as the materials handling facility 210 or in one or more alternate or virtual locations, e.g., in a "cloud"-based environment.

The sensors 274 may include, but are not limited to, one or more imaging devices (e.g., the imaging device 220) having diverse fields of view of the materials handling facility 210, or other scenes, that are configured to capture imaging data that may be processed to recognize and locate motion, locations and/or orientations of various actors within the materials handling facility 210. For example, in some implementations, an actor may present one or more credentials prior to entering the materials handling facility 210, or while such actors are present within the materials handling facility 210, within the fields of view or ranges of the sensors 274. One or more identifiers of the actor (e.g., an account number associated with the actor) may be determined based on such credentials, and assigned to pixels that are depicted within such imaging data and correspond to the actor. By assigning identifiers of actors to pixels, or by creating descriptors of pixels that are associated with actors, an actor may be identified in images that are subsequently captured by the sensors or the imaging device 220. The motion, locations and/or orientations of the actors within the materials handling facility 210 may be monitored by the one or more sensors 274. When an actor has been identified as being associated with an event in which an item is retrieved or deposited, one of the item may be added to a virtual shopping cart or other record associated with the actor, or removed from the virtual shopping cart or other record associated with the actor, as necessary.

Alternatively, the sensors 274 may include any other type of sensing systems for detecting actors and recognizing their motion, locations and/or orientations within the materials handling facility 210. Such sensors 274 may include, but are not limited to, one or more load or weight sensors provided on walking or traveling surfaces within the materials handling facility 210, one or more RFID components (e.g., antennas or tags) for transmitting and/or receiving RFID signals associated with actors, one or more LIDAR sensors or receivers for detecting actors, or any other systems or components by which information regarding actors and their motion, locations and/or orientations may be gathered. The type or form of sensors 274 that may gather information or data regarding actors and their motion, locations and/or orientations at the materials handling facility 210 are not limited.

The processors 272 may be programmed or otherwise configured to generate one or more trajectories or tracklets representative of the motion, the locations and/or the orientations of each of the actors within the materials handling facility 210, such as one or more three-dimensional articulated models of partial or complete sets of body parts of the actors within the materials handling facility 210, based on information or data gathered by the sensors 274. Such models may be generated as vectors or functions over time that represent motion of body parts embodied by nodes and edges between such nodes, or in any other manner.

The data processing system 280 includes one or more physical computer servers 282 having one or more data stores 284 (e.g., databases) and transceivers 286 associated therewith, and may be provided for any specific or general purpose. For example, the data processing system 280 of FIG. 2 may be independently provided for the exclusive purpose of receiving, analyzing or storing information or data relating to inventory items that are available at the materials handling facility 210, information or data relating to workers, customers or other actors at the materials handling facility 210, or any other information or data. Alternatively, the data processing system 280 may be provided in connection with one or more physical or virtual services that are configured to receive, analyze or store such information or data, or other information or data, as well as one or more other functions. In some implementations, the data processing system 280 of FIG. 2 may be configured to receive, analyze or store information or data relating to operations of the materials handling facility 210, including but not limited to inventory levels at the materials handling facility 210 at various times.

The data processing system 280 may be associated with the materials handling facility 210 and, alternatively, or additionally, one or more electronic marketplaces (e.g., online marketplaces), physical (e.g., bricks-and-mortar) marketplaces, fulfillment centers, other materials handling facilities, warehouses, distribution centers, cross-docking facilities, order fulfillment facilities, packaging facilities, shipping facilities, rental facilities, libraries, retail stores or establishments, wholesale stores, museums, or any other facilities or systems. Alternatively, the data processing system 280 may be maintained separate and apart (e.g., independent) of or from any such facilities.

The servers 282 may be connected to or otherwise communicate with the data stores 284 or transceivers 286, or to one or more other computer devices or systems over the network 290, through the sending and receiving of digital data. In some implementations, the data processing system 280 may be provided in the same physical location as the materials handling facility 210. In other such implementations, the data processing system 280 may be provided in one or more alternate or virtual locations, e.g., in a "cloud"-based environment, or onboard one or more aerial vehicles.

The network 290 may be any wired network, wireless network, or combination thereof, and may comprise the Internet in whole or in part. In addition, the network 290 may be a personal area network, local area network, wide area network, cable network, satellite network, cellular telephone network, or combination thereof. The network 290 may also be a publicly accessible network of linked networks, possibly operated by various distinct parties, such as the Internet. In some implementations, the network 290 may be a private or semi-private network, such as a corporate or university intranet. The network 290 may include one or more wireless networks, such as a Global System for Mobile Communications (GSM) network, a Code Division Multiple Access (CDMA) network, a Long-Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and other resources described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method (e.g., speech recognition or gesture recognition devices or techniques) to interact with the computers, servers, devices and the like, or to "select" an item, link or any other aspect of the present disclosure.

The data and/or computer-executable instructions, programs, firmware, software and the like (also referred to herein as "computer-executable" components) described herein may be stored on a transitory and/or non-transitory computer-readable medium that is within or accessible by computers or computer components such as the server 212 or the imaging device 220, or any other computers or control systems utilized by or in association with the materials handling facility 210, and having sequences of instructions which, when executed by a processor (e.g., a central processing unit, or "CPU," or a graphics processing unit, or "GPU"), cause the processor to perform all or a portion of the functions, services and/or methods described herein. Such computer-executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some implementations of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/ machine-readable medium that may be suitable for storing electronic instructions. Further, implementations may also be provided as a computer-executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

As is discussed above, some implementations of the present disclosure may be used to determine inventory levels on shelves or other storage units by capturing images of counting devices having patterns or other visible markings thereon. Changes in orientations of the patterns or other visible markings detected in images captured at different times may be processed to determine changes in loading on or contents of such shelves or other storage units. Based on such changes in orientations, levels of inventory on one or more shelves or storage units may be updated accordingly, and changes in the levels of inventory may be associated with one or more actors.

Figure 3:
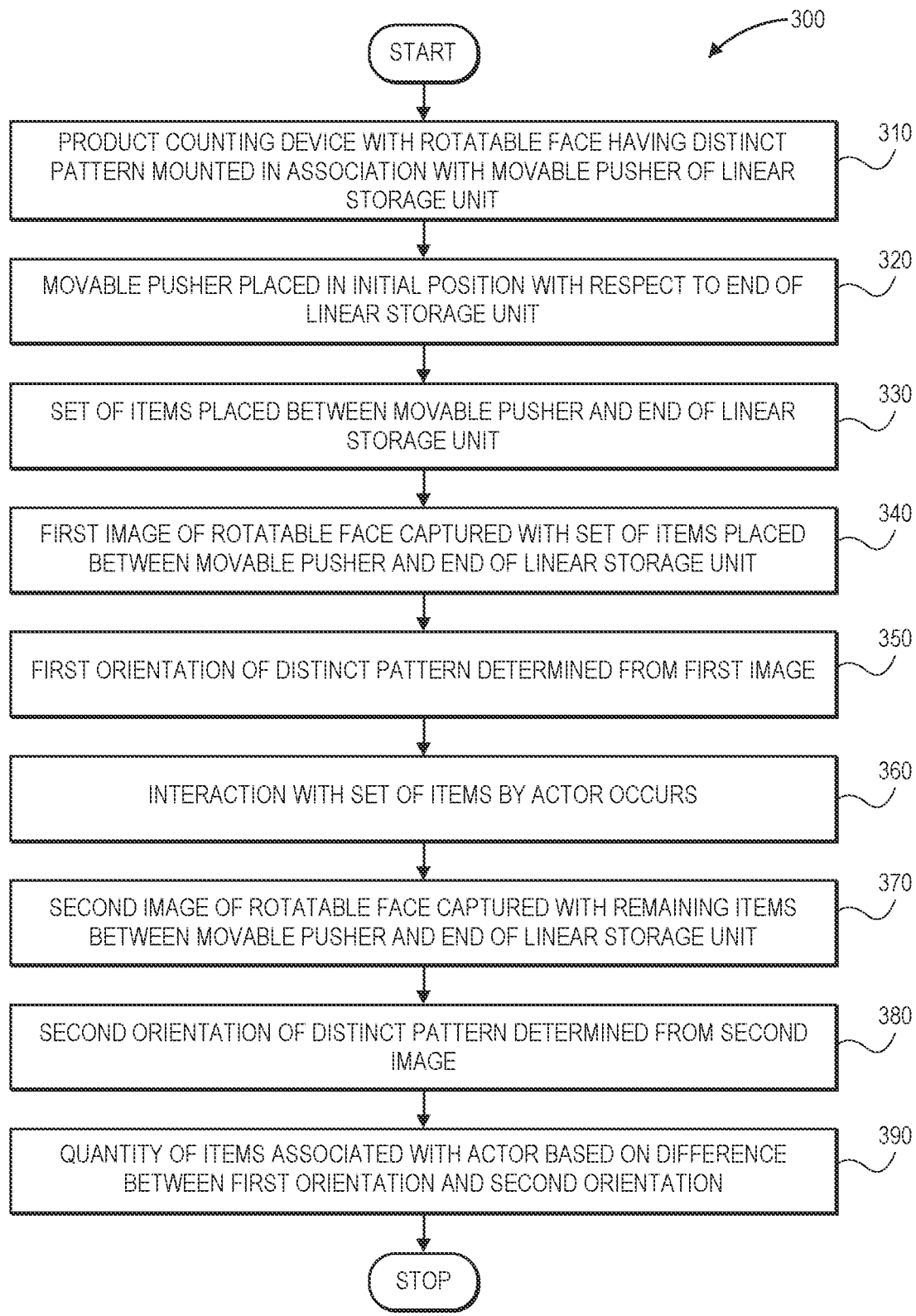
FIG. 3 is a flow chart of one process for determining inventory levels in accordance with implementations of the present disclosure.

Referring to FIG. 3, a flow chart 300 of one process for determining inventory levels in accordance with implementations of the present disclosure is shown. At box 310, a product counting device having a rotatable face with a distinct pattern is mounted in association with a movable pusher of a linear storage unit. For example, the product counting device may be mounted to a front end of a storage unit or in any other location with respect to the storage unit, in a manner that causes the rotatable face of the product counting device to rotate about an axis as a function of a position of the movable pusher. In some implementations, the product counting device may be joined to the movable pusher by a tether or another tension member, which may be coiled within or otherwise in association with the product counting device. Additionally, the product counting device may be rotationally biased in one rotational direction, e.g., clockwise or counter-clockwise, and configured to release the tether or the other tension member upon rotation in an opposite rotational direction, such a is shown in FIGS. 1C through 1F. Alternatively, in some implementations, the product counting device may be mounted in association with the movable pusher in any other manner. The distinct pattern may include any number of lines, shapes, colors, textures, alphanumeric characters, symbols or the like, defining arrangements from which unique orientations of the distinct pattern may be unambiguously determined by a human or a computer device or system.

At box 320, the movable pusher is placed in an initial position with respect to an end of the storage unit. For example, as is shown in FIG. 1G, an actor (e.g., an associate or a worker) may manipulate the movable pusher in a linear direction, e.g., along a track, by causing the movable pusher to move using one or more hands. In some implementations, the movement of the movable pusher causes the rotatable face to rotate by an amount or an extent consistent with a linear distance by which the movable pusher is moved to the initial position. For example, where the movable pusher is coupled to the product counting device by a tether or other tension member coiled about a reel or other system within the product counting device, an angle of rotation of the rotatable face may be determined as a function of the circumference of the reel about which the tether or other tension member is coiled.

At box 330, a set of items is placed between the movable pusher and the end of the linear storage unit. For example, as is shown in FIG. 1H, an actor may place a stack or a series of the items into a space between the movable pusher and an end of the storage unit. Where the movable pusher is biased toward the end of the storage unit, e.g., by one or more springs or other biasing elements, the set of items may be compressed or otherwise maintained therebetween. In some implementations, each of the set of items may be substantially thin, slender or lightweight items or packages thereof, such as greeting cards and envelopes, gift cards (e.g., temporary payment instruments adhered to paper backings by hot-melt adhesives), or plant or flower seeds, food products (e.g., snacks, gum, mints or others), books, personal care products, beverages, or other items, or any other items having similar dimensions or proportions that may be homogeneous in nature.

At box 340, a first image of the rotatable face is captured, e.g., as a single image, or as one of a stream of images, with the set of items placed between the movable pusher and the end of the linear storage unit. For example, in some implementations, such as is shown in FIG. 1I, a camera or another imaging device may be aligned to include the linear storage system and any other aspects of a materials handling facility within a field of view, e.g., one or more storage units, floor surfaces or other portions or locations of the materials handling facility, and to capture images at any frame rate. The camera may be a digital camera or other imaging device that is utilized to capture imaging data for any purpose, including but not limited to event detection, customer location, or the like, as well as for capturing images of the product counting device and determining an orientation of the rotatable face depicted within such images. Alternatively, in some other implementations, the camera may be provided in a dedicated manner, e.g., for the exclusive purpose of capturing images of the product counting device. Moreover, in some implementations, the first image may have been captured following an initial loading of the set of items between the pusher and the end of the storage unit.

At box 350, a first orientation of the distinct pattern is determined from the first image. For example, the camera or other imaging device that captured the first image may be configured to process the first image and detect or recognize the distinct pattern therein. An orientation of the distinct pattern may be determined with respect to one or more aspects of the distinct pattern (e.g., borders, colors, contours, outlines, textures, silhouettes, shapes or other characteristics of the distinct pattern) and a coordinate system of the first image, such as with respect to horizontal or vertical arrangements of image pixels within the first image. For example, where the distinct pattern includes one or more pixels aligned along a common line or in a common location, the alignment of the common line may be compared to horizontal or vertical lines or pixels within the first image. Alternatively, the camera or other imaging device may provide the first image to a server or other computer device or system, e.g., over one or more networks, via a wired or wireless connection.

At box 360, an interaction with the set of items by an actor occurs. For example, an actor (e.g., a customer, or a worker or an associate) may remove one of the items of the set, or place another item in the space between the movable pusher and the end of the storage unit into which the set of items is compressed or maintained therein.

At box 370, a second image of the rotatable face is captured with the remaining items between the movable pusher and the end of the linear storage unit. The second image may be captured at any frame rate or interval with respect to the first image.

At box 380, a second orientation of the distinct pattern is determined from the second image. For example, as is discussed above, the distinct pattern may be detected or otherwise recognized within the second image, and the second orientation may be determined with respect to one or more aspects of the distinct pattern and a coordinate system of the second image, e.g., horizontal or vertical arrangements of image pixels within the second image. In some implementations, the second orientation of the distinct pattern may be determined based on the same aspects of the distinct pattern, with respect to the second image, that were relied upon in determining the first orientation of the distinct pattern with respect to the first image.

At box 390, a quantity of items is associated with the actor based on the difference between the first orientation and the second orientation, and the process ends. For example, where a difference between the first orientation and the second orientation is defined by or represented in an angle between one or more aspects of the distinct pattern in the first image and the one or more aspects of the distinct pattern in the second image, the angle may be associated with a change in a linear distance of the movable pusher following the interaction by the actor at box 360, as is discussed above. Therefore, the change in the linear distance of the pusher may be determined and used to identify the quantity of items, which may be associated with the actor on any basis. For example, where an identity of the actor is known, the quantity of items may be added to a data record associated with the actor, or removed from a data record associated with the actor, as appropriate.

Figure 4A:
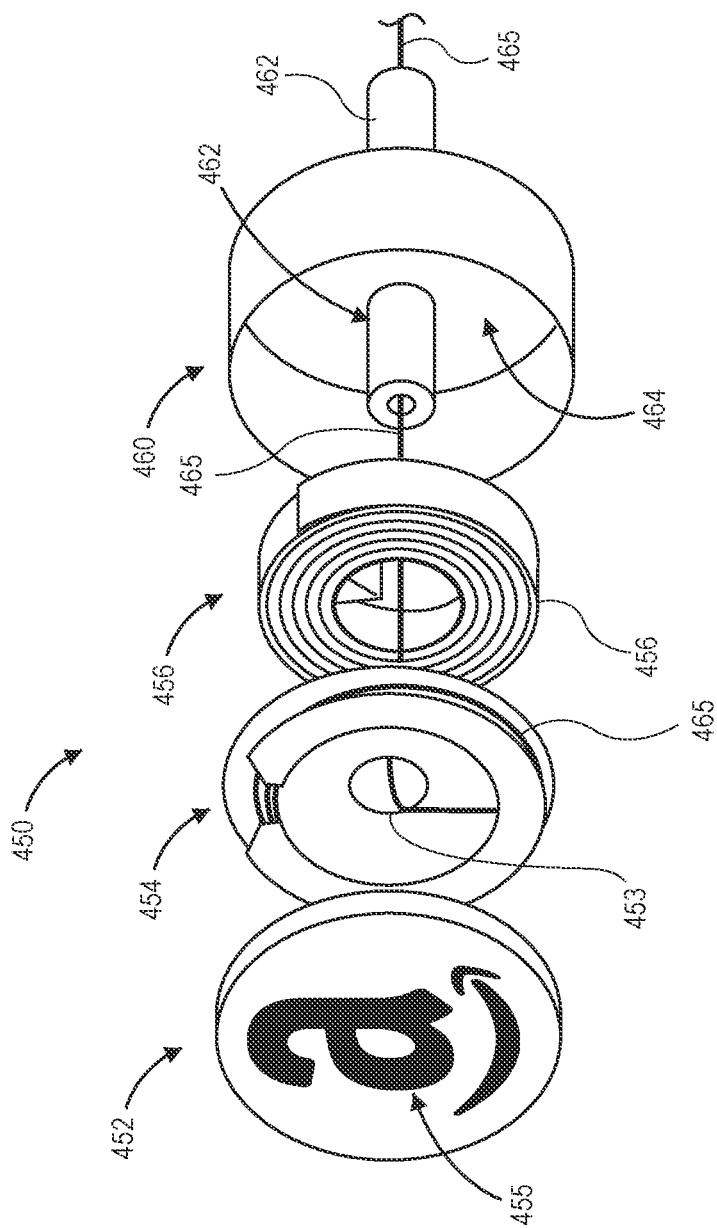
FIGS. 4A through 4C are views of aspects of one system for determining inventory levels in accordance with implementations of the present disclosure.
Figure 4B:
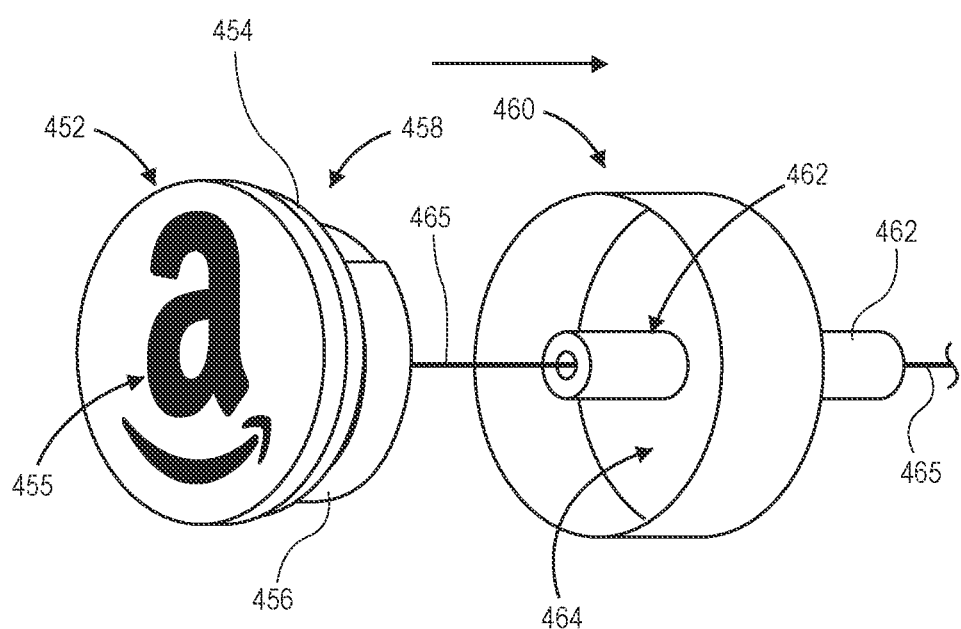
Figure 4C:
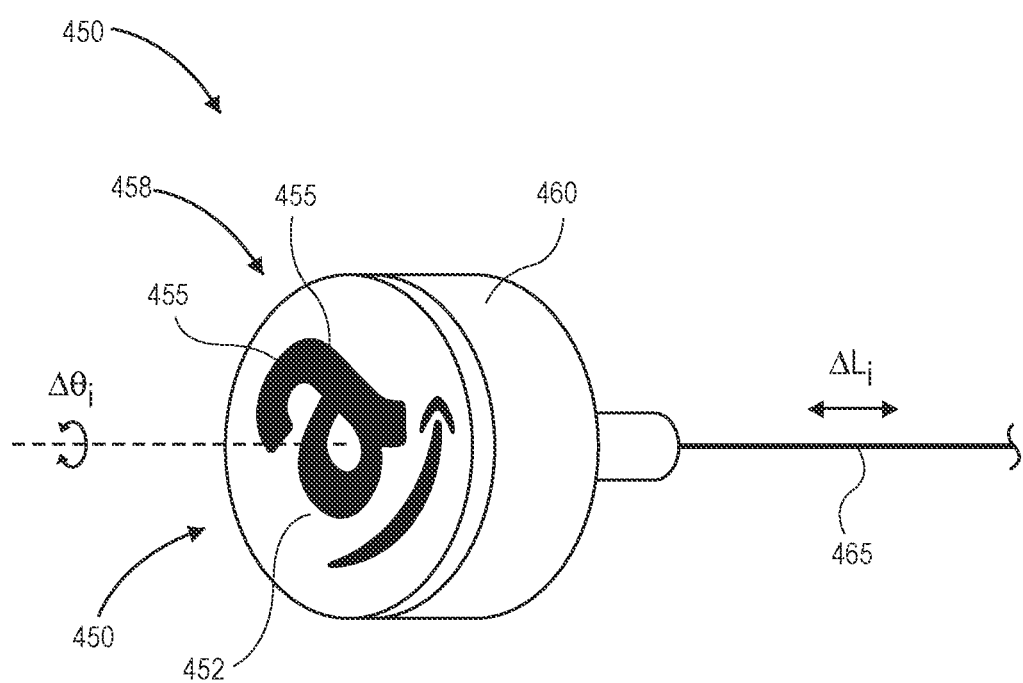

As is discussed above, a counting device may include surfaces with patterns or visible markings thereon that are configured to rotate in response to changes in linear positions of pushers or other movable systems. Referring to FIGS. 4A through 4C, views of aspects of one system for determining inventory levels in accordance with implementations of the present disclosure are shown. Except where otherwise noted, reference numerals preceded by the number "4" shown in FIGS. 4A through 4C indicate components or features that are similar to components or features having reference numerals preceded by the number "2" shown in FIG. 2 or by the number "1" shown in FIGS. 1A through 1M.

An exploded view of components of a product counting device 450 is shown in FIG. 4A. A view of a subassembly 458 of the product counting device 450 and a housing 460 of the product counting device 450 is shown in FIG. 4B. A view of the product counting device 450, as assembled, is shown in FIG. 4C.

As is shown in FIG. 4A, the product counting device 450 includes a front panel 452, a reel 454, a biasing element 456 and a housing 460. The front panel 452 has a symbol 455 on an outer surface thereof, and has an inner surface that is aligned to contact the reel 454. Additionally, as is also shown in FIG. 4A, the reel 454 has a tether 465 that has a first end coupled to the reel 454. One or more portions of the tether 465 are wrapped around the reel 454, e.g., for any number of revolutions, and extended through a hole 453 in the reel 454. The biasing element 456 may be a constant-torque spring, a constant-force spring, or any other element for supplying rotational bias to the front panel 452 or the reel 454. One end of the biasing element 456 may be coupled to the reel 454 or the front panel 452, and another end of the biasing element 456 may be coupled to a portion of the housing 460.

The housing 460 has a structure defining a cavity having a shape and a form of a cylinder having one end closed by a bottom 464 and one open end. As is shown in FIG. 4A, the cylindrical shape of the housing 460 has a diameter that is substantially larger than a height of the housing 460. Additionally, the bottom 464 of the housing 460 includes a bore 462 extending therethrough, and one or more portions of the tether 465 that extend through the hole of the reel 453 and a corresponding hole in the biasing element 456 also extend through the bore 462.

As is shown in FIG. 4B, the front panel 452 may be joined to the reel 454 and the biasing element 456 to form a subassembly 458. The product counting device 450 may be assembled by extending the tether 465 from the subassembly 458 through the bore 462 of the bottom 464 of the housing 460, and coupling another end of the biasing element 456 to an outer surface of the bore 462 or another interior surface or component of the housing 460.

As is shown in FIG. 4C, with the subassembly 458 mounted within the housing 460 to form the product counting device 450, the subassembly 458 is permitted to rotate freely about an axis defined by the bore 462, in response to tension supplied by movement of a pusher (not shown), subject to bias or rotational resistance supplied by the biasing element 456. An angle $\Delta\theta_i$ of the subassembly 458, and the pattern 455 thereon, about the axis defined by the bore 458 may be determined as a function of a change in a distance $\Delta L'$ or a deflection of the tether 465, such as is discussed above.

Patterns or other visible markings on surfaces of a counting device may take any form, and may have any size or shape, e.g., circles, triangles, rectangles or others, in accordance with implementations of the present disclosure. Referring to FIGS. 5A through 5D, views of aspects of systems for determining inventory levels in accordance with implementations of the present disclosure are shown. Except where otherwise noted, reference numerals preceded by the number "5" shown in FIGS. 5A through 5D indicate components or features that are similar to components or features having reference numerals preceded by the number "4" shown in FIGS. 4A through 4C, by the number "2" shown in FIG. 2 or by the number "1" shown in FIGS. 1A through 1M.

As is shown in FIG. 5A, a front panel 552A having a shape of a circle includes a marking 555A in the form of a pair of semicircles, one of which is substantially dark-colored and another of which is substantially light-colored. An orientation of the marking 555A may be determined from an image captured of the marking 555A, for example, by detecting differences in positions of the substantially dark-colored pixels and the substantially light-colored pixels, or detecting changes in alignment of the diameter dividing the substantially dark-colored pixels and the substantially light-colored pixels, in a pair of images captured at distinct times.

A change in orientation of the marking 555A shown in FIG. 5A, as determined from images captured at two distinct times, may be interpreted and associated with a change in a linear position of a pusher or other movable system on a shelf or other storage unit between such times. A quantity or number of inventory items corresponding to the change in the linear position of the pusher or the other system may be determined and used to update an inventory record, or to associate the quantity or the number of inventory items with an actor.

Similarly, as is shown in FIG. 5B, a front panel 552B having a shape of a circle includes a marking 555B in the form of a partial two-dimensional bar code (e.g., a "QR" code). Where the marking 555B has a distinct arrangement or pattern, e.g., an irregular or asymmetrical layout of contrasted light and dark portions framed by horizontal and vertical lines, the marking 555B may be detected within images captured by a camera, and orientations of the marking 555B within such images may be determined based on differences in locations of pixels embodying the distinct arrangement or pattern. In some implementations, the marking 555B may be encoded to embody or represent supplemental information or content, or a link to one or more resources having supplemental information or content stored thereon, e.g., a link to one or more web-based or other electronic resources regarding a shelf or other storage unit with which a counting device including the front panel 552B is associated.

Likewise, as is shown in FIG. 5C, a front panel 552C having a shape of a circle includes a marking 555C in the form of a fiducial defined in part by concentric rings or circles that are broken or supplemented by wedge-shaped extensions therefrom. Where the marking 555C has a distinct arrangement or pattern, as defined by such concentric rings, circles or wedge-shaped extensions, the marking 555C may be detected within images captured by a camera, and orientations of the marking 555C within such images may be determined based on the distinct arrangement or pattern. Also, as is shown in FIG. 5D, a front panel 552D having a shape of a triangle includes a marking 555D with alternating dark-colored and light-colored sections. Where the marking 555D has a distinct arrangement or pattern, as defined by such sections, the marking 555D may be detected within images captured by a camera, and orientations of the marking 555D within such images may be determined based on the distinct arrangement or pattern.

Changes in orientation of the markings 555A, 555B, 555C, 555D, as determined from images captured at distinct times, may be interpreted and associated with changes in linear positions of a pusher or other movable system on a shelf or other storage unit between such times. Quantities or numbers of inventory items corresponding to the changes in the linear position of the pusher or the other system may be determined and used to update inventory records, or to associate the quantity or the number of inventory items with actors.

As is discussed above, when a counting device of the present disclosure is provided in association with an inventory shelf or another storage unit within a field of view of a camera, the camera or one or more computer systems in communication with the camera may be calibrated to detect or recognize a pattern or other marking on a rotatable surface of the counting device within images captured by the camera, and to determine orientations of the pattern or other marking within such images based on a location and an orientation of the counting device with respect to the camera. Referring to FIGS. 6A through 6D, views of aspects of systems for determining inventory levels in accordance with implementations of the present disclosure are shown. Except where otherwise noted, reference numerals preceded by the number "6" shown in FIGS. 6A through 6D indicate components or features that are similar to components or features having reference numerals preceded by the number "5" shown in FIGS. 5A through 5D, by the number "4" shown in FIGS. 4A through 4C, by the number "2" shown in FIG. 2 or by the number "1" shown in FIGS. 1A through 1M.

Figure 6A:
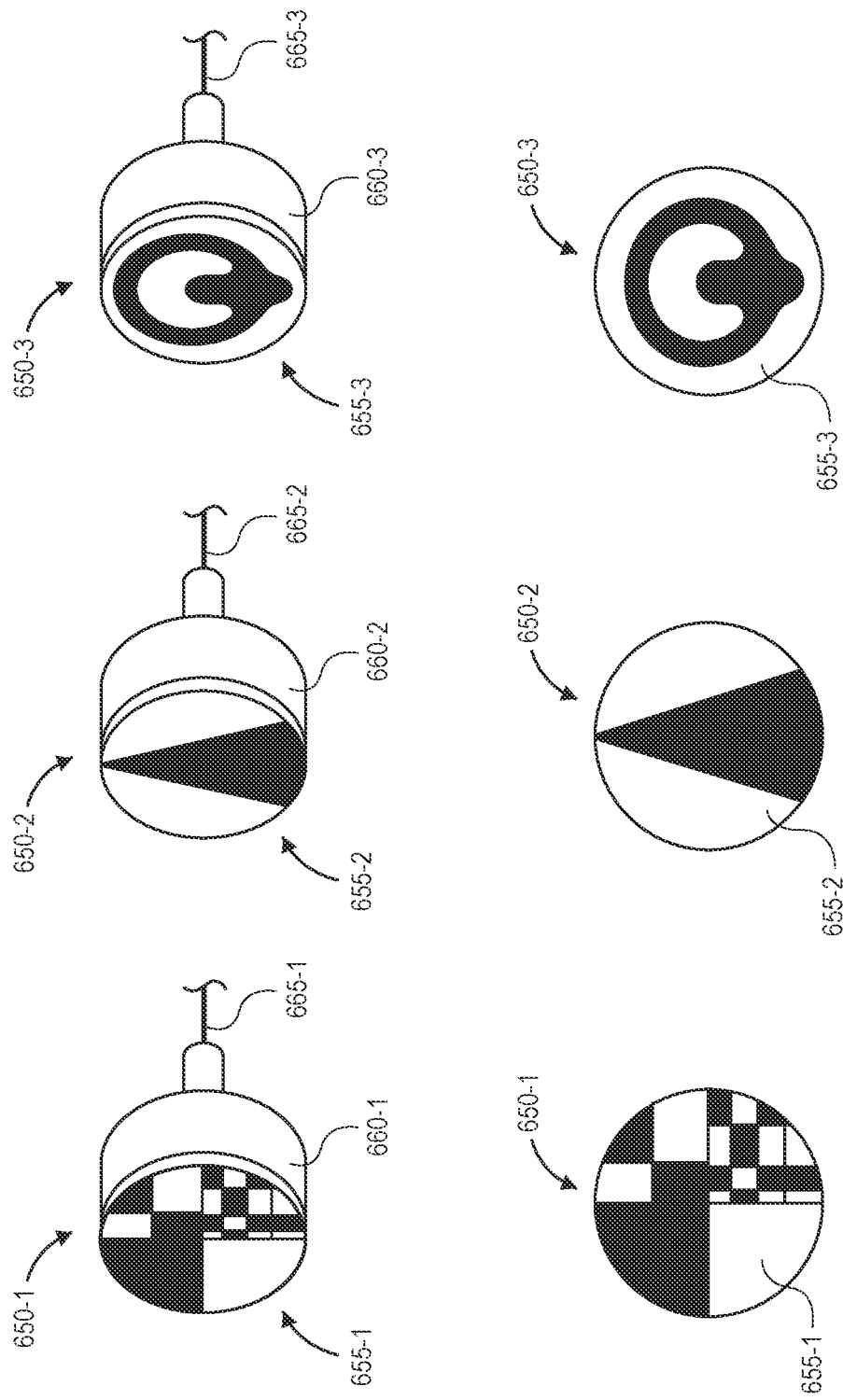
FIGS. 6A through 6D are views of aspects of systems for determining inventory levels in accordance with implementations of the present disclosure.

Perspective and front views of embodiments of each of a plurality of counting devices 650-1, 650-2, 650-3 are shown in FIG. 6A. Each of the plurality of counting devices 650-1, 650-2, 650-3 includes a pattern 655-1, 655-2, 655-3 or other visible marking on a surface or other component that is configured to rotate with respect to a housing 660-1, 660-2, 660-3. The patterns 655-1, 655-2, 655-3 may include any number of lines, shapes, colors, textures, alphanumeric characters, symbols or the like, defining arrangements from which unique orientations of the patterns 655-1, 655-2, 655-3 may be unambiguously determined by a human or a computer device or system. As is further shown in FIG. 6A, each of the patterns 655-1, 655-2, 655-3 has a round or otherwise circular shape. Each of the plurality of counting devices 650-1, 650-2, 650-3 also includes a tether 665-1, 665-2, 665-3 that is aligned or configured for coupling to a pusher or other movable system of an inventory shelf or another storage unit.

Figure 6B:
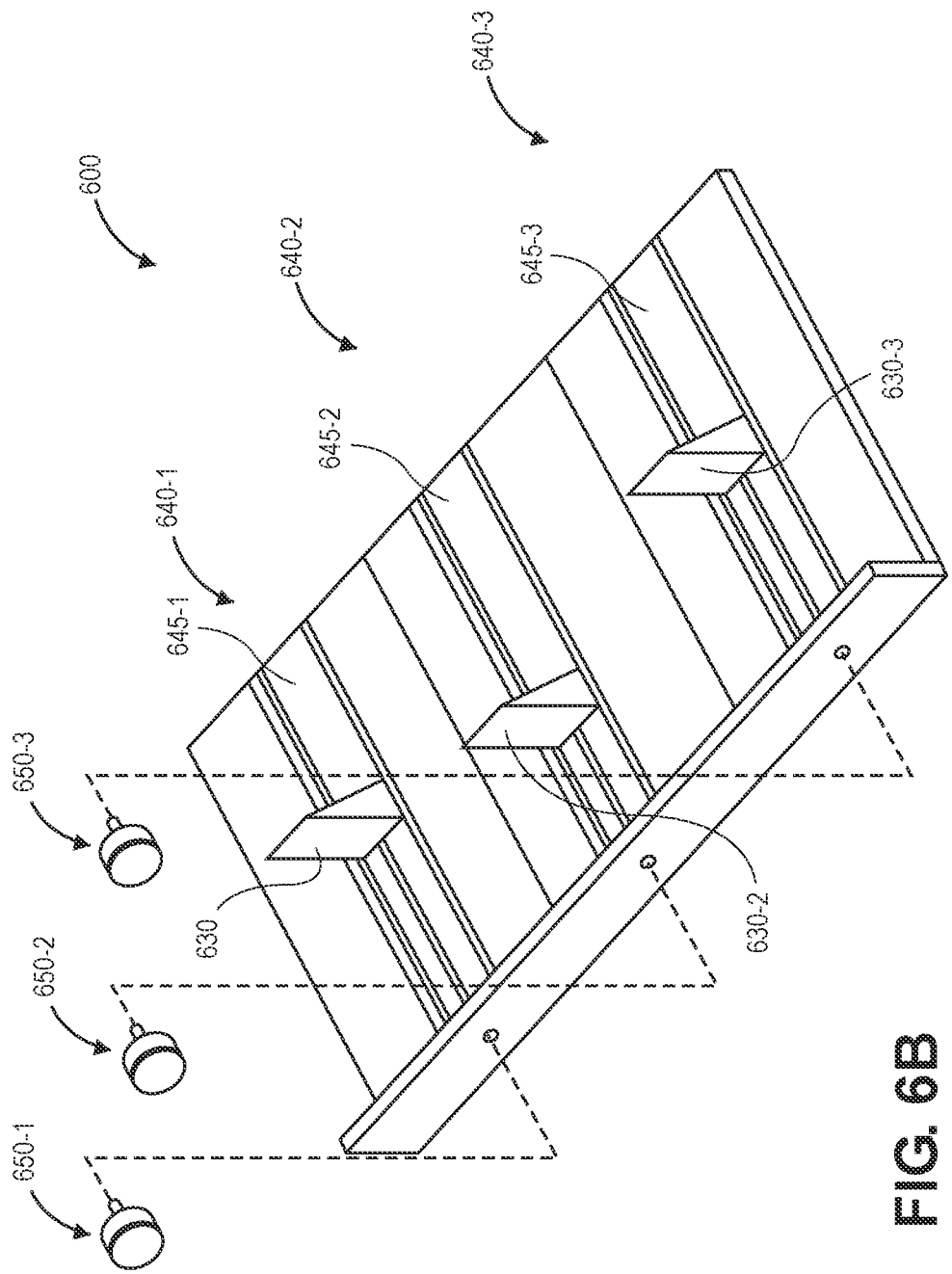

As is shown in FIG. 6B, the counting devices 650-1, 650-2, 650-3 are configured for mounting or installation in association with inventory shelves 640-1, 640-2, 640-3 of an inventory system 600. For example, as is shown in FIG. 6B, each of the counting devices may be mounted or installed at front edges of the inventory shelves 640-1, 640-2, 640-3 and coupled to pushers 630-1, 630-2, 630-3 movably or slidably provided within tracks 645-1, 645-2, 645-3 of such shelves 640-1, 640-2, 640-3, e.g., by their respective tethers 665-1, 665-2, 665-3. The patterns 655-1, 655-2, 655-3 may be provided on surfaces of the counting devices 655-1, 655-2, 655-3 that independently biased to rotate in one rotational direction, e.g., clockwise or counter-clockwise, and are configured to rotate in another rotational direction, e.g., counter-clockwise or clockwise, as the tethers 665-1, 665-2, 665-3 are withdrawn therefrom by movements of the pushers 630-1, 630-2, 630-3. Likewise, the pushers 630-1, 630-2, 630-3 themselves may be biased toward front ends of the inventory shelves 640-1, 640-2, 640-3.

Figure 6C:
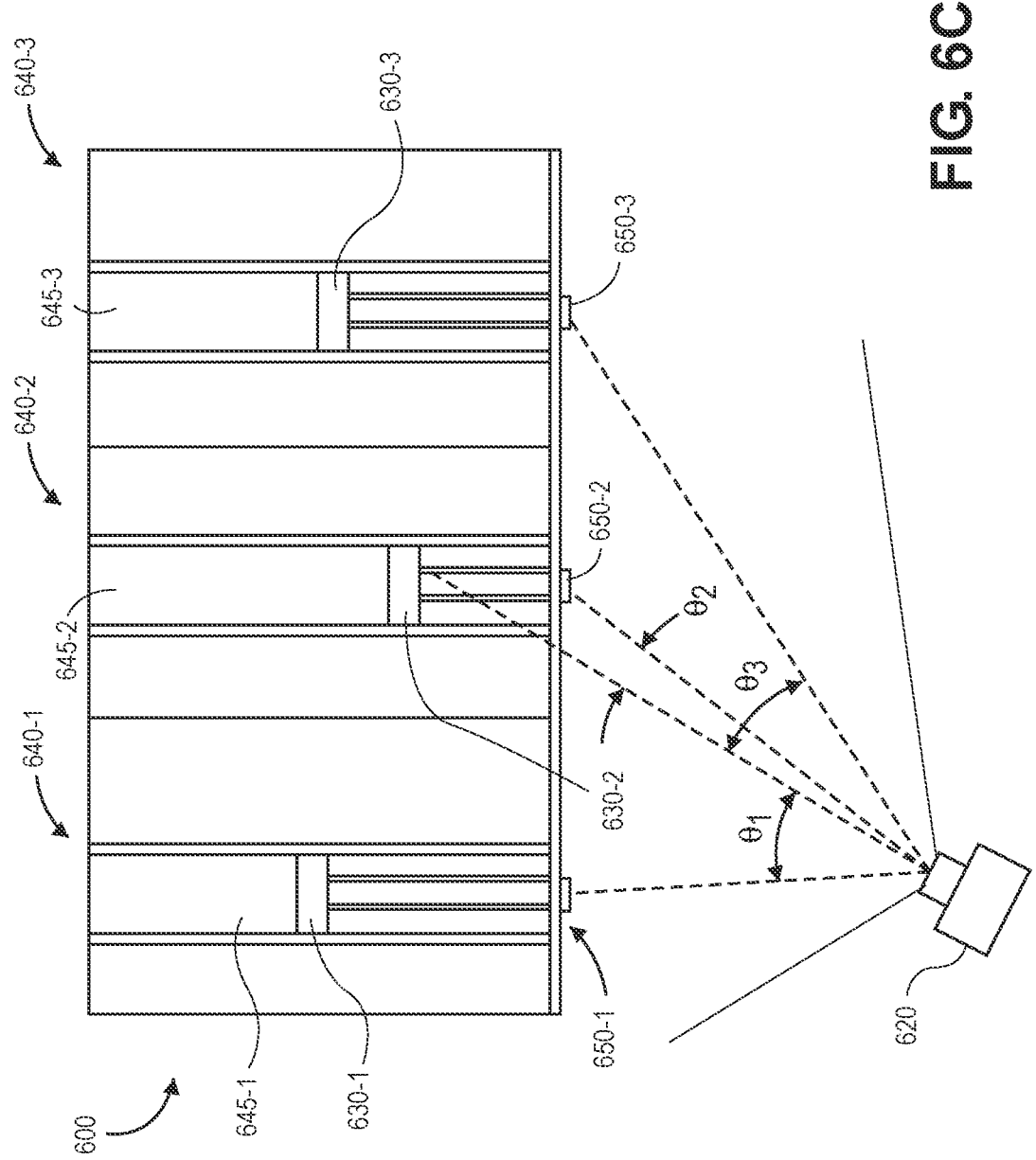
Figure 6D:
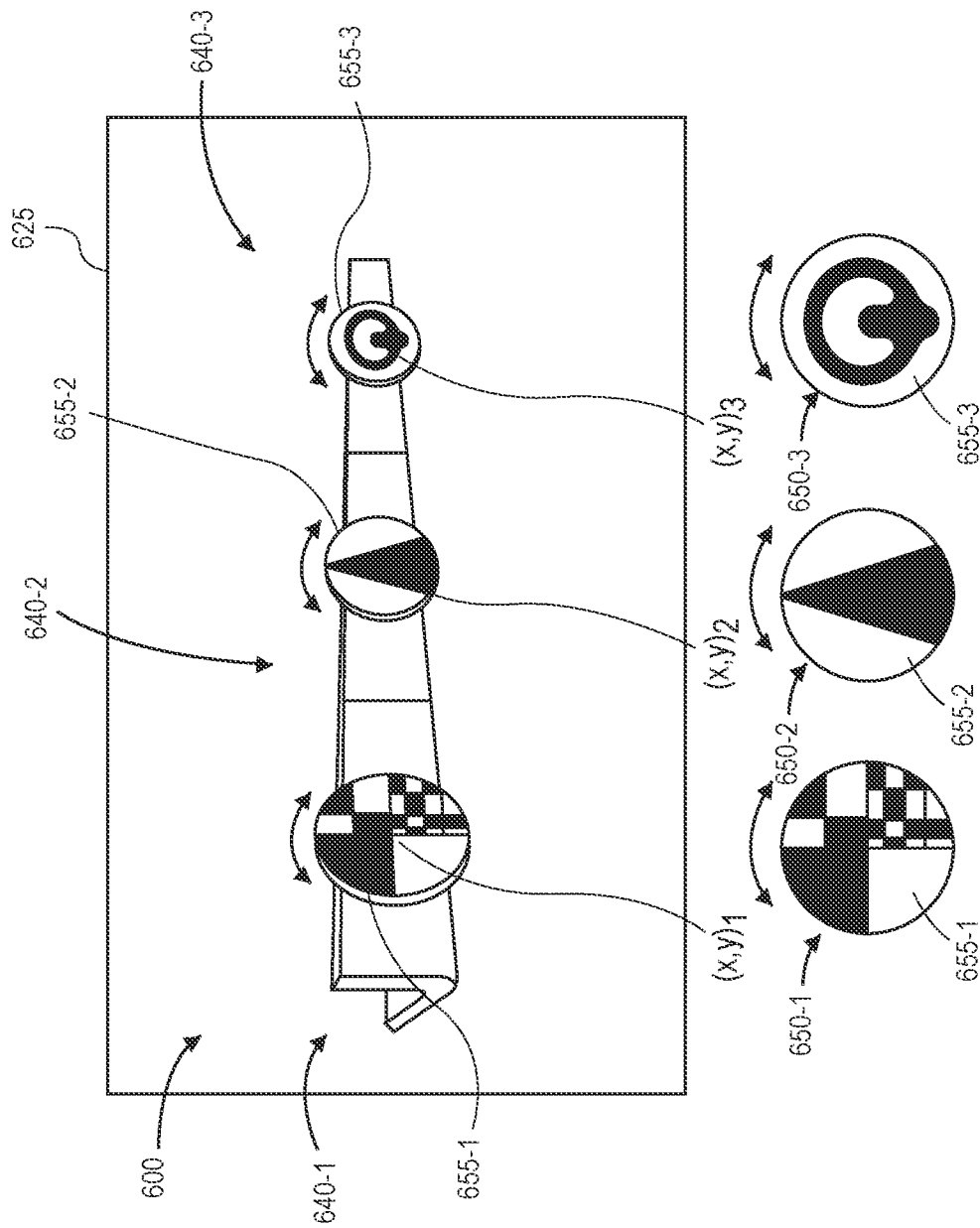

As is shown in FIG. 6C, prior to or after mounting or installing the counting devices 650-1, 650-2, 650-3 in association with the inventory shelves 640-1, 640-2, 640-3, a camera 620 may be mounted or installed in a manner that includes the inventory shelves 640-1, 640-2, 640-3 and the counting devices 655-1, 655-2, 655-3 within a field of view of the camera 620. For example, as is shown in FIG. 6C, the counting device 650-1 is provided at a distance $d_1$ and an angle $\gamma_1$ with respect to an axis of orientation of the camera 620. Likewise, the counting device 650-2 is provided at a distance $d_2$ and an angle $\gamma_2$ with respect to the axis of orientation of the camera 620, and the counting device 650-3 is provided at a distance $d_3$ and an angle $\gamma_3$ with respect to the axis of orientation of the camera 620. The distances QQQ and the angles QQQ may be selected on any basis, including but not limited to physical preferences or limitations within a facility in which the inventory system 600 and the camera 620 are provided, or one or more attributes of the camera 620, including but not limited to As is shown in FIG. 6D, an image 625 captured by the camera 620 depicts the inventory system 600, including the patterns 655-1, 655-2, 655-3 of the counting devices 650-1, 650-2, 650-3 provided at the front ends of the inventory shelves 640-1, 640-2, 640-3. In some implementations, the image 625 may be a calibration image, or an initial image captured once the counting devices 650-1, 650-2, 650-3 or the camera 620 are mounted or otherwise installed. The image 625 may be processed to calibrate or otherwise train or configure the camera 620 to detect or recognize the patterns 655-1, 655-2, 655-3 within its fields of view. In some other implementations, the image 625 may be captured at any other time.

Locations $(x, y)_1$, $(x, y)_2$, $(x, y)_3$ of the counting devices 650-1, 650-2, 650-3 may be identified in any manner. For example, in some implementations, the image 625 may be manually or automatically annotated, e.g., by placing virtual markings or layers such as boxes, shapes, characters or symbols on the image 625 to denote the presence and locations $(x, y)_1$, $(x, y)_2$, $(x, y)_3$ of the counting devices 650-1, 650-2, 650-3. Alternatively, in some implementations, the camera 620 or a computer system associated with the camera 620 may be trained to detect the patterns 655-1, 655-2, 655-3 and to determine their respective locations $(x, y)_1$, $(x, y)_2$, $(x, y)_3$ within the image 625. In still other implementations, such as where attributes of a field of view of the camera 620 and the locations $(x, y)_1$, $(x, y)_2$, $(x, y)_3$ are known, the locations $(x, y)_1$, $(x, y)_2$, $(x, y)_3$ may be back-projected into the field of view of the camera 620 and determined accordingly.

Once the locations $(x, y)_1$, $(x, y)_2$, $(x, y)_3$ of the counting devices 650-1, 650-2, 650-3 depicted within the image 625 have been determined, the camera 620 may be programmed with attributes of the patterns 655-1, 655-2, 655-3, including the front views of the patterns 655-1, 655-2, 655-3 such as is shown in FIG. 6A, and configured to determine the sizes and orientations of the patterns 655-1, 655-2, 655-3 at the locations $(x, y)_1$, $(x, y)_2$, $(x, y)_3$ with respect to the camera 620. For example, as is shown in FIG. 6A, although each of the patterns 655-1, 655-2, 655-3 has a shape of a circle, each of the patterns 655-1, 655-2, 655-3 appears as an ellipse or another curvilinear shape within the image 625. Moreover, the camera 620 or the computer system in communication with the camera 620 may be programmed with one or more identifiers of a respective one of the inventory shelves 640-1, 640-2, 640-3 with which each of the patterns 655-1, 655-2, 655-3 or counting devices 650-1, 650-2, 650-3 is associated, or identifiers of items to be stored on such shelves.

Once the locations, sizes and orientations of each of the counting devices 650-1, 650-2, 650-3 within a field of view of the camera 620 have been determined, items may be placed on each of the inventory shelves 640-1, 640-2, 640-3, viz., between the pushers 630-1, 630-2, 630-3 and the front ends of the inventory shelves 640-1, 640-2, 640-3, and changes in the orientations of the patterns 655-1, 655-2, 655-3 may be detected within images captured by the camera 620.

Figure 7:
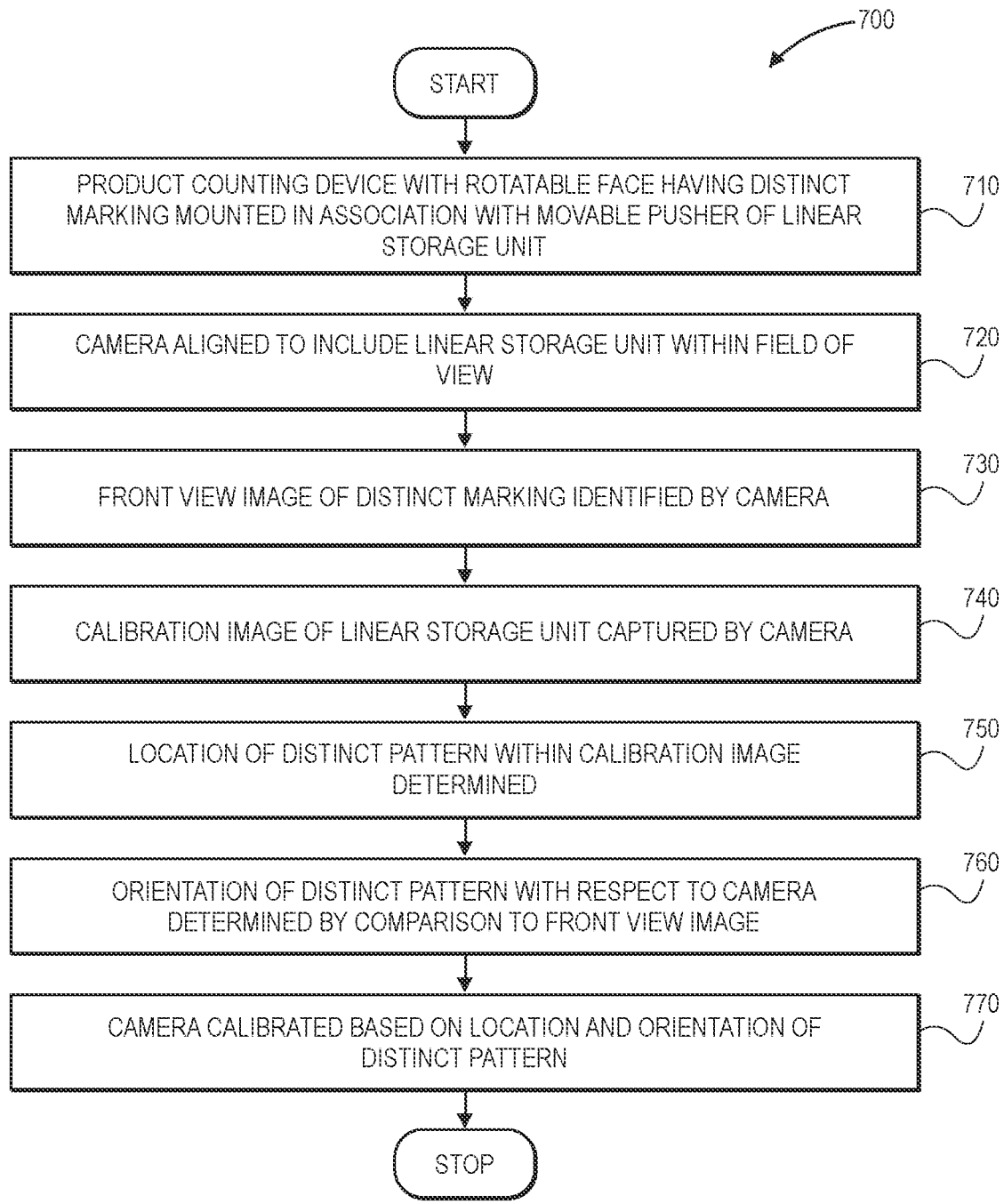
FIG. 7 is a flow chart of one process for determining inventory levels in accordance with implementations of the present disclosure.

Referring to FIG. 7, a flow chart 700 of one process for determining inventory levels in accordance with implementations of the present disclosure is shown. At box 710, a product counting device having a rotatable face with a distinct marking is mounted in association with a movable pusher of a linear storage unit. For example, the product counting device may be mounted to a front end of a storage unit or in any other location with respect to the storage unit, in a manner that causes the rotatable face of the product counting device to rotate about an axis as a function of a position of the movable pusher. The distinct marking may include any number of lines, shapes, colors, textures, alphanumeric characters, symbols or any other markings, defining an arrangement from which a unique orientation of the distinct marking may be unambiguously determined by a human or a computer device or system, e.g., according to one or more computer vision algorithms, systems or techniques.

At box 720, a camera or another imaging device may be aligned to include the linear storage unit and any other aspects of a materials handling facility within a field of view, e.g., one or more storage units, floor surfaces or other portions or locations of the materials handling facility, and configured to capture images at any frame rate. The camera may be a digital camera or other imaging device that is utilized to capture imaging data for any purpose, including but not limited to event detection, customer location, or the like, as well as for capturing images of the product counting device and determining an orientation of the rotatable face depicted within such images. Alternatively, in some other implementations, the camera may be provided in a dedicated manner, e.g., for the exclusive purpose of capturing images of the product counting device. The camera may be aligned at a distance from the product counting device, and in an orientation with respect to the product counting device, that ensures that the product counting device and the distinct marking thereon may be readily detected within images captured by the camera. In some implementations, the distance and the orientation may be selected based on one or more attributes of the camera, including a level of resolution of the camera.

At box 730, a front view image of the distinct marking on the rotatable face is identified by the camera. The front view image may, such as is shown in FIGS. 6A and 6D, depict the visual marking from a frontal view, e.g., without any distortion. The front view image depicts the appearance of the distinct marking when the distinct marking is aligned along an axis of orientation of a camera, and perpendicular to the axis of orientation of the camera. The front view image may be stored in one or more memory components of the camera, or, alternatively, in one or more computer systems or devices in communication with the camera.

At box 740, a calibration image of the linear storage unit is captured by the camera. The calibration image may be detected upon an initial mounting or installation of the product counting device to the linear storage unit, or an initial mounting or installation of the linear storage unit in a specific location within a materials handling facility or other facility. Alternatively, or additionally, the calibration image may be captured upon an initial mounting or installation of the camera with respect to the linear storage unit, or at any other time, such as at regular or periodic intervals, or upon a completion of maintenance, inspections or repairs to the linear storage unit, the product counting device or the camera.

At box 750, a location of the distinct marking within the calibration image is determined. The location may be identified manually by one or more humans, e.g., according to one or more annotation techniques, or by one or more automated systems, e.g., according to one or more computer vision algorithms, systems or techniques. The location of the distinct marking may be determined by one or more processors or processor units operating on the camera, or on one or more computer devices or systems in communication with the camera.

At box 760, an orientation of the distinct marking with respect to the camera is determined by comparison to the front view image identified at box 730. As with the location of the distinct marking determined at box 750, the orientation of the distinct marking may be determined by one or more processors or processor units operating on the camera, or on one or more computer devices or systems in communication with the camera.

At box 770, the camera is calibrated based on the location of the distinct marking determined at box 750 and the orientation of the distinct marking determined at box 760, and the process ends. Once calibrated, the camera may be used to capture images of the counting device, and to determine changes in orientations of the distinct marking from such images. The changes in orientation may be used to determine proportional changes in linear positions of a pusher, which may then be used to calculate a number of items associated with an interaction with the linear storage unit, e.g., a placement of such items onto the linear storage unit, or a removal of such items from the linear storage unit.

Although some of the implementations disclosed herein reference the determination of inventory levels provided on shelves or other storage units, or other surfaces, e.g., in a commercial setting, the systems and methods of the present disclosure are not so limited. For example, the systems and methods disclosed herein may be used to determine numbers of items in any type of commercial or non-commercial settings, and may utilize counting devices of any size, shape or form that are mounted in any location or orientation with respect to shelves or other storage units, or other surfaces.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Additionally, it should also be appreciated that the detailed description is set forth with reference to the accompanying figures. In the figures, the use of the same reference numbers in different figures indicates similar or identical items or features. Except where otherwise noted, left-most digit(s) of a reference number identify a figure in which the reference number first appears, while two right-most digits of a reference number in a figure indicate a component or a feature that is similar to components or features having reference numbers with the same two right-most digits in other figures.

Moreover, with respect to the one or more methods or processes of the present disclosure shown or described herein, including but not limited to the flow chart shown in FIG. 3 or 7, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A system comprising:
    a storage unit having a first pusher and a front end, wherein the first pusher is provided within a first track and biased toward the front end of the storage unit by a first spring;
    a first counting device mounted at the front end of the storage unit, wherein a portion of the first counting device comprises a first visible pattern thereon, and wherein at least the portion of the first counting device is configured to rotate about a first axis in response to a change of position of the first pusher within the first track;
    a camera comprising at least one processor unit and a visual sensor, wherein a field of view of the camera includes the portion of the first counting device; and
    a server in communication with the camera, wherein the server is programmed with one or more sets of instructions that, when executed by the server, cause the server to at least:
        receive a first image from the camera, wherein the first image was captured by the camera at a first time, and wherein a plurality of items is provided between the first pusher and the front end of the storage unit at the first time;
        detect the first visible pattern within the first image;

determine a first orientation of the first visible pattern within the first image;

receive a second image from the camera, wherein the second image was captured by the camera at a second time;

detect the first visible pattern within the second image;

determine a second orientation of the first visible pattern within the second image;

determine a difference between the first orientation of the first visible pattern and the second orientation of the first visible pattern;

calculate a number of the plurality of items based at least in part on the difference between the first orientation of the first visible pattern and the second orientation of the first visible pattern; and determine that at least one interaction involving the number of the plurality of items occurred between the first time and the second time.

2. The system of claim 1, wherein the first counting device comprises:

a front panel having the first visible pattern thereon;

a second spring having a first end and a second end;

a reel, wherein the first end of the second spring is coupled to the reel;

a tether, wherein a first end of the tether is coupled to the reel, wherein a second end of the tether is coupled to the first pusher, and wherein at least a first portion of the tether is coiled around the reel; and a housing, wherein the housing has a shape of a cylinder having an open first end and a closed second end, wherein a bore extends through the second end, and wherein at least a second portion of the tether is extended through the bore, and wherein the second end of the second spring is coupled to the housing;

wherein the front panel is joined to the reel to form a subassembly, wherein the subassembly is configured to rotate about the first axis in a first rotational direction or a second rotational direction in response to the change of position of the first pusher within the first track, and wherein the second spring supplies bias to the subassembly in one of the first rotational direction or the second rotational direction.

3. The system of claim 1, wherein the number of the at least one item is calculated based at least in part on:

a radius of the reel;

a thickness of one of the plurality of items; and the difference between the first orientation of the first visible pattern and the second orientation of the first visible pattern.

4. The system of claim 1, wherein each of the items comprises one of a greeting card, an envelope, a package of seeds, a book, a personal care product, or a beverage.

5. The system of claim 1, wherein the first visible pattern comprises one of:

a symbol;

an asymmetric marking;

a bar code; or an alphanumeric character.

6. The system of claim 1, wherein the storage unit comprises a plurality of pushers provided within tracks, wherein each of the pushers is biased toward the front end of the storage unit by a spring, wherein the first track is one of the tracks, wherein the first pusher is one of the pushers, and wherein the system further comprises:

a plurality of counting devices mounted at the front end of the storage unit, wherein portions of each of the counting devices comprise visible patterns thereon, wherein the portions of the counting devices are configured to rotate about axes in response to changes in position of one of the pushers within the one of the tracks, wherein each of the portions of the counting devices is within the field of view of the camera, and wherein the first counting device is one of the counting devices.

7. A method comprising:

capturing, by a camera, a first image at a first time, wherein a first counting device is within a field of view of the camera, wherein the first counting device is provided in association with a first shelf, wherein a first portion of the first counting device having a first visible pattern thereon is configured to rotate about a first axis in response to changes in position of a first pusher slidably disposed in a first track on the first shelf, and wherein a first plurality of items is provided between a first contact face of the first pusher and the first end of the shelf at the first time;

determining a first orientation of the first visible pattern within the first image;

capturing, by the camera, a second image at the second time;

determining a second orientation of the first visible pattern within the second image;

determining a change in position of the first pusher between the first time and the second time based at least in part on a difference between the first orientation and the second orientation;

calculating a number of the first plurality of items based at least in part on the change in position; and determining that an interaction involving the number of the first plurality of items occurred between the first time and the second time.

8. The method of claim 7, wherein the first counting device comprises:

a front panel, wherein the front panel is the first portion of the first counting device;

a spring having a first end and a second end;

a reel, wherein the first end of the spring is coupled to the reel;

a tether, wherein a first end of the tether is coupled to the reel, wherein a second end of the tether is coupled to the first pusher, and wherein at least a first portion of the tether is coiled around the reel; and a housing, wherein the housing has a shape of a cylinder having an open first end and a closed second end, wherein a bore extends through the second end, and wherein at least a second portion of the tether is extended through the bore, and wherein the second end of the spring is coupled to the housing, wherein the front panel is joined to the reel to form a subassembly, wherein the subassembly is configured to rotate about the first axis in a first rotational direction or a second rotational direction in response to the change of position of the first pusher within the first track, and wherein the spring supplies bias to the subassembly in one of the first rotational direction or the second rotational direction.

9. The method of claim 8, wherein each of the front panel and the housing is formed from one or more of a metal, a wood, a polyacrylate or a polyethylene.

10. The method of claim 8, wherein calculating the number of the first plurality of items comprises:
calculating a distance that the first pusher moved based at least in part on a radius of the reel and the difference between the first orientation of the first visible pattern and the second orientation of the first visible pattern; and
determining a quotient of the distance and a thickness of one of the first plurality of items,
wherein the number of the first plurality of items is approximately the quotient.

11. The method of claim 7, wherein each of the first plurality of items has a substantially common thickness.

12. The method of claim 7, wherein determining the first orientation of the first visible pattern within the first image comprises:
determining locations of each of a first set of image pixels corresponding to a first portion of the first visible pattern depicted within the first image; and
determining locations of each of a second set of image pixels corresponding to a second portion of the first visible pattern depicted within the first image, and
wherein determining the first orientation of the first visible pattern within the first image comprises:
determining locations of each of the first set of image pixels depicted within the second image; and
determining locations of each of the second set of image pixels depicted within the second image.

13. The method of claim 7, wherein the first shelf is one of a plurality of shelves,
wherein each of the shelves comprises a plurality of pushers provided within tracks,
wherein the first track is one of the tracks,
wherein the first pusher is one of the pushers,
wherein the field of view of the camera includes:
a plurality of counting devices mounted at the ends of the shelves, wherein portions of each of the counting devices comprise visible patterns thereon, wherein the portions of the counting devices are configured to rotate about axes in response to changes in position of one of the pushers within the one of the tracks, and
wherein the first counting device is one of the counting devices.

14. The method of claim 7, wherein each of the first orientation, the second orientation and the change in position of the first pusher is determined by at least one processor unit operating on the camera.

15. The method of claim 7, further comprising:
transmitting the first image to a server over a network, wherein the first orientation of the first visible pattern within the first image is determined by the server;
transmitting the second image to the server over the network, wherein the second orientation of the first visible pattern within the first image is determined by the server; and
storing, by the server, an indication that the interaction involving the number of the first plurality of items occurred between the first time and the second time.

16. The method of claim 7, wherein the tether comprises one or more of a natural fiber, an artificial fiber or a chain.

17. The method of claim 7, wherein the first visible pattern has a shape of a circle, a triangle or a rectangle.

18. A counting device comprising:
a front panel having a visible pattern thereon;
a spring;
a reel, wherein a first end of the second spring is coupled to the reel;
a tether, wherein a first end of the tether is coupled to the reel, and wherein at least a first portion of the tether is coiled around the reel;
a housing, wherein the housing has a shape of a cylinder having an open first end and a closed second end, wherein a bore extends through the second end, and wherein at least a second portion of the tether is extended through the bore, and wherein a second end of the spring is coupled to the housing;
wherein the front panel is joined to the reel with the spring therebetween to form a subassembly;
wherein the subassembly is configured to rotate within the housing about an axis defined by the bore in a first rotational direction or a second rotational direction; and
wherein the spring supplies bias to the subassembly in one of the first rotational direction or the second rotational direction.

19. The counting device of claim 18, wherein a second end of the tether is coupled to a pusher slidably mounted within a track of a storage unit,
wherein the pusher is biased toward a first end of the storage unit, and
wherein the subassembly is configured to rotate about the first axis in response to a change in position of the pusher within the track.

20. The counting device of claim 19, wherein the visible pattern comprises one of:
a symbol;
an asymmetric marking;
a bar code; or
an alphanumeric character.

* * * * *